US005353904A

United States Patent [19]

Tacke et al.

[11] Patent Number: 5,353,904

[45] **Date of Patent: * Oct. 11, 1994**

[54] BINOCULAR VENDING APPARATUS AND METHOD

[75] Inventors: David J. Tacke, Polson, Mont.; Leslie Perhacs, Fallbrook, Calif.

[73] Assignee: Binoptic International Systems, Inc., Polson, Mont.

[ * ] Notice: The portion of the term of this patent subsequent to Sep. 22, 2009 has been disclaimed.

[21] Appl. No.: 948,292

[22] Filed: Sep. 21, 1992

Related U.S. Application Data

[63] Continuation of Ser. No. 340,129, Apr. 18, 1989, Pat. No. 5,148,905.

[51] Int. Cl.[5] .......... C07F 7/00; C07F 17/02

[52] U.S. Cl. .......... 194/210; 194/256; 194/350; 248/553

[58] Field of Search .......... 194/210, 214, 250, 253, 194/254, 256, 258, 259, 291, 350, 905; 232/7, 12, 15, 16; 248/553

[56] References Cited

U.S. PATENT DOCUMENTS

| | | | |
|---|---|---|---|
| D. 184,881 | 4/1959 | Maquire | D57/1 |
| D. 188,704 | 8/1960 | Maquire | D57/1 |
| D. 198,402 | 6/1964 | Maguire | D57/1 |
| D. 198,590 | 7/1964 | Maguire | D57/1 |
| D. 222,563 | 11/1971 | Maguire | D16/08 |
| 403,200 | 5/1889 | Leavitt | 194/253 |
| 405,659 | 6/1889 | Colby | 194/251 |
| 1,295,034 | 2/1919 | Lattig . | |
| 1,632,377 | 11/1924 | Johnson | 194/255 |
| 1,711,271 | 4/1929 | Lorentzen | 194/250 |
| 2,531,236 | 11/1950 | Snell et al. | 194/211 |
| 2,783,937 | 3/1957 | Hudson | 232/15 |

(List continued on next page.)

FOREIGN PATENT DOCUMENTS

| | | | |
|---|---|---|---|
| 512786 | 10/1971 | Switzerland . | |
| 449541 | 6/1936 | United Kingdom . | |
| 2018484 | 10/1979 | United Kingdom | 194/210 |

OTHER PUBLICATIONS

The Sports Eye* Systems Corp. brochure (Copyright Sports Eye* Systems Corp. 1983).

*Primary Examiner*—F. J. Bartuska

*Attorney, Agent, or Firm*—Merchant, Gould, Smith, Edell, Welter & Schmidt

[57] ABSTRACT

A binocular vending apparatus for attachment to a structure, preferably a seat bottom, a seat back or a pedestal, is provided. The vending apparatus includes binoculars, a housing for removably retaining binoculars, and a mounting plate which is attachable to the structure, wherein the housing is mountable to the mounting plate when the mounting plate is attached to the structure. The vending apparatus preferably includes an elongated tether connected to the housing and also to the binoculars such that the binoculars are tethered to the housing. The vending apparatus preferably includes a binocular vending machine operated by magnetic tokens. The magnetic tokens have a magnetic code for actuating elements of the vending machine such that the vending machine will respond in a predetermined manner to the insertion of the vending token. Preferably, the vending token includes a plurality of magnetic regions having opposite magnetic pole orientations. A banking device for collecting vending apparatus operating tokens is also provided. Methods of vending binoculars, providing binoculars for patrons in spectator facilities, and collecting vending apparatus operating tokens are also provided.

24 Claims, 15 Drawing Sheets

U.S. PATENT DOCUMENTS

| | | | |
|---|---|---|---|
| 2,905,227 | 9/1959 | Baer, Sr. | 155/2 |
| 2,918,158 | 12/1959 | Shlank | 194/213 |
| 2,992,771 | 7/1961 | McClung | 232/16 |
| 3,107,847 | 10/1963 | Laviana | 232/16 |
| 3,133,618 | 5/1964 | Taylor | 194/227 |
| 3,171,020 | 2/1965 | Lord | 235/61.11 |
| 3,330,394 | 7/1967 | Koch | 194/233 |
| 3,440,606 | 4/1969 | Bayha | 340/149 |
| 3,499,739 | 3/1970 | Segel | 29/191 |
| 3,531,177 | 9/1970 | Akin, Jr. | 350/36 |
| 3,642,345 | 2/1972 | Akin, Jr. et al. | 350/65 |
| 3,744,872 | 7/1973 | Akin, Jr. et al. | 350/36 |
| 3,926,291 | 12/1975 | Burke et al. | 194/213 |
| 3,938,733 | 2/1976 | Weber et al. | 232/16 |
| 4,006,342 | 2/1977 | Baumann et al. | 235/61.11 D |
| 4,142,566 | 3/1979 | Stolp | 150/52 J |
| 4,185,730 | 1/1980 | Roes et al. | 194/210 |
| 4,213,467 | 7/1980 | Stulen et al. | 128/733 |
| 4,319,674 | 3/1982 | Riggs et al. | 194/210 |
| 4,335,605 | 6/1982 | Ekman | 73/163 |
| 4,421,220 | 12/1983 | Jaffe et al. | 194/212 |
| 4,509,632 | 4/1985 | Jaffe | 194/214 |
| 4,518,919 | 5/1985 | Ishida | 324/228 |
| 4,556,250 | 12/1985 | Chapman | 297/192 |
| 4,607,881 | 8/1986 | Merrick | 297/192 |
| 4,616,491 | 10/1986 | Genest | 70/276 |
| 4,627,251 | 12/1986 | Bhate | 70/276 |
| 4,662,197 | 5/1987 | Tietz et al. | 70/276 |
| 4,665,726 | 5/1987 | Prunbauer et al. | 70/276 |
| 4,674,618 | 6/1987 | Eglise et al. | 194/210 |
| 4,714,184 | 12/1987 | Young et al. | 294/139 X |
| 4,739,637 | 4/1988 | Finkel et al. | 248/553 X |
| 4,790,432 | 12/1988 | Rees | 206/315.11 |

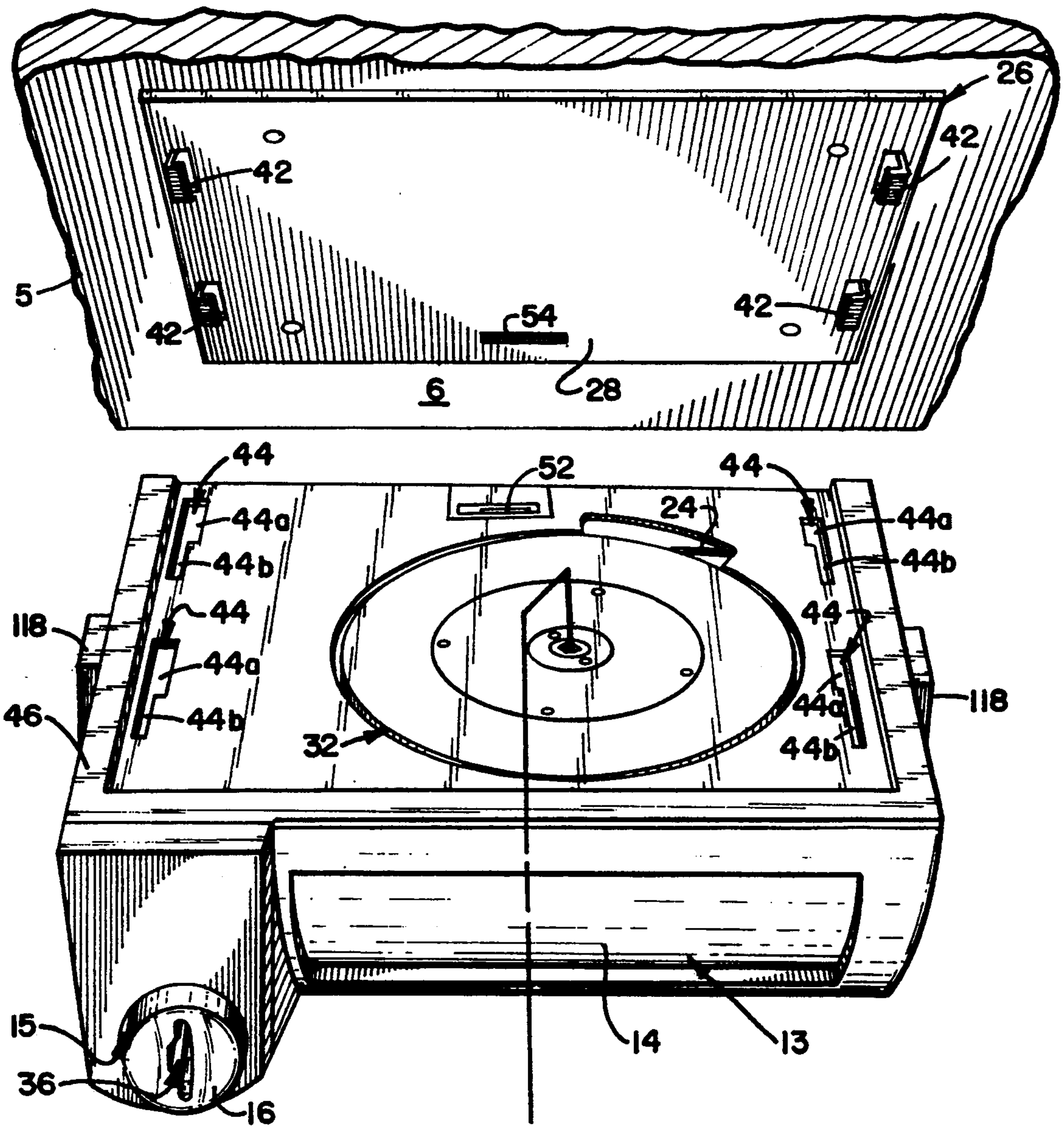
FIG. 9
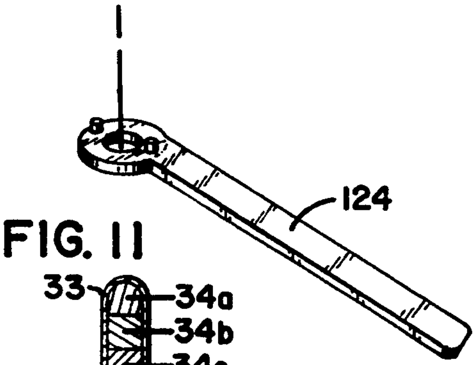
FIG. 10
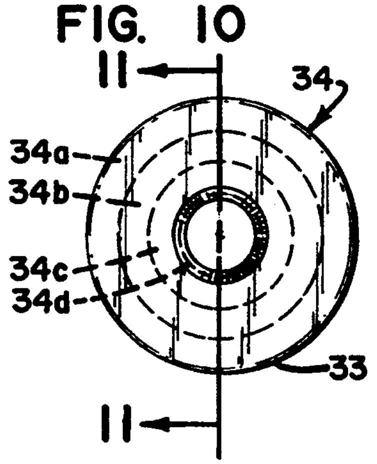
FIG. 11
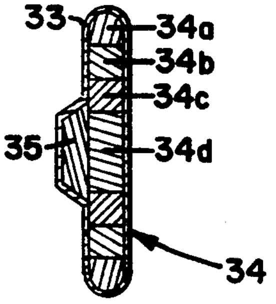

FIG. 13
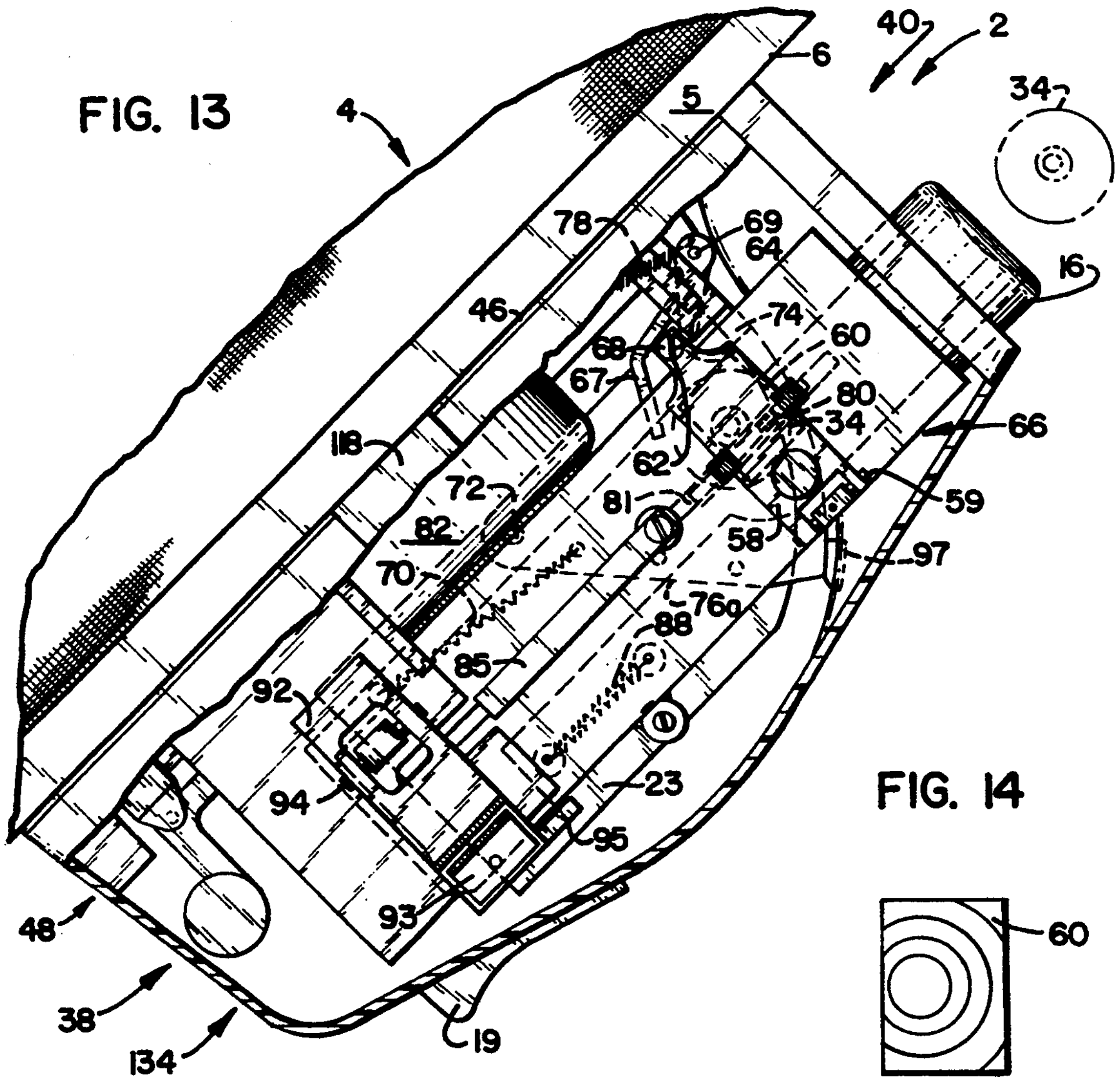
FIG. 14
FIG. 15
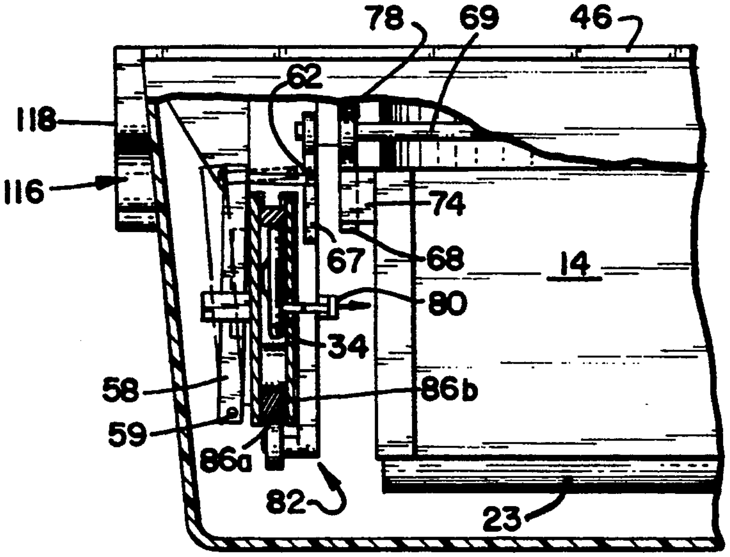

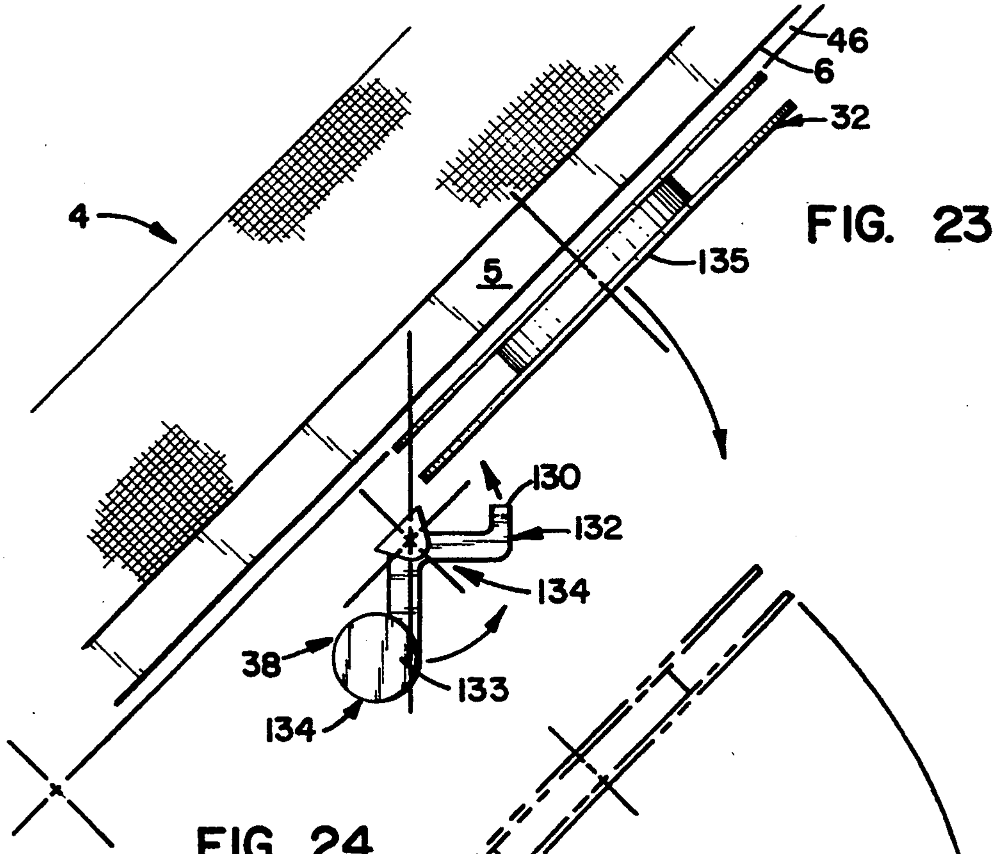
FIG. 23
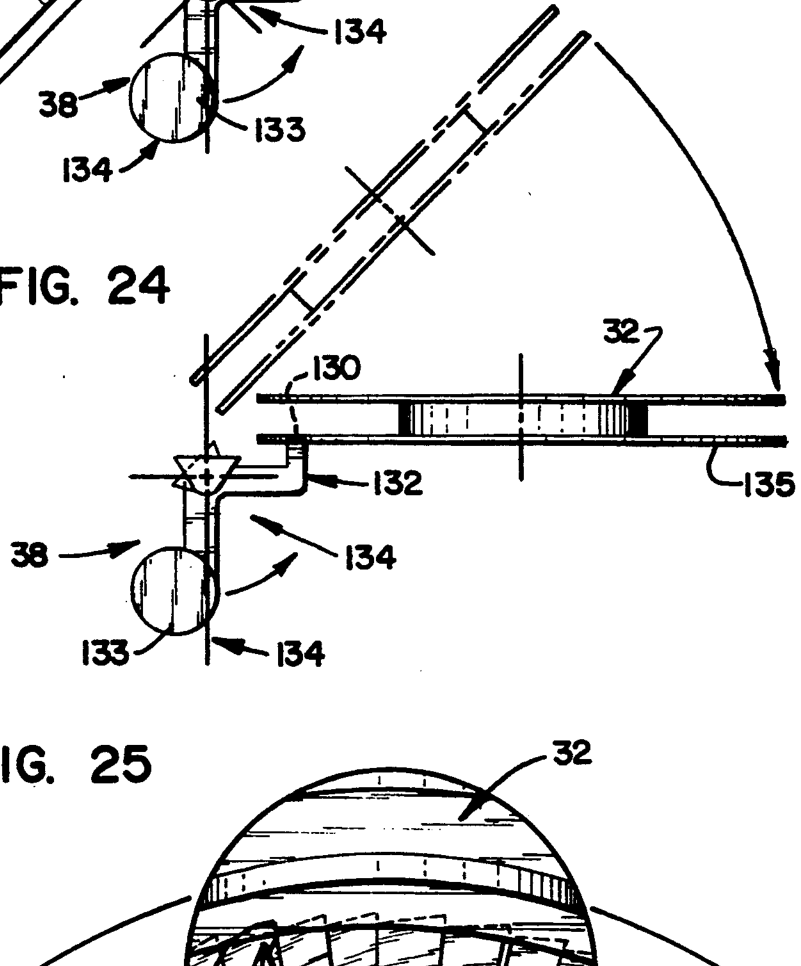
FIG. 24
FIG. 25
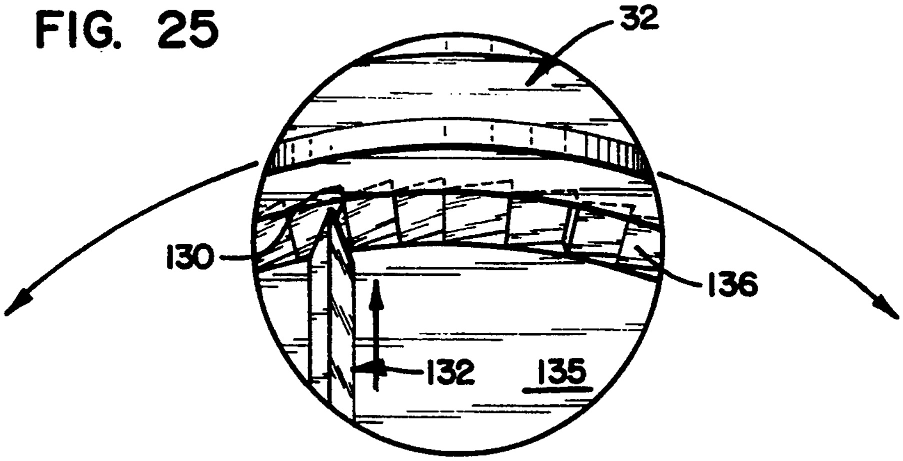

BINOCULAR VENDING APPARATUS AND METHOD

This is a continuation of application Ser. No. 07/340,129, filed Apr. 18, 1989, now U.S. Pat. No. 5,148,905.

FIELD OF THE INVENTION

The present invention relates to an apparatus for vending view enhancing equipment, preferably binoculars, in spectator facilities.

BACKGROUND OF THE INVENTION

Binoculars are widely used by spectators in large and small spectator facilities to enhance their view of events from seats which are removed from the activity being viewed. In the past, however, it has generally been necessary for spectators to bring their own binoculars. This usually creates a dilemma for the owner of the binoculars, however, because, first, it is bothersome to have to carry the binoculars to and from the facility, second, there is a chance that one's binoculars can be damaged or stolen during transit to and from the facility or during the time when the owner is attending an event in the facility, and, third, for this reason, the owner must divide his or her attention between watching the events taking place and keeping track of the binoculars so that they are not damaged or stolen.

In addition, there are many spectators who do not own a pair of binoculars, but would, nevertheless, like to use binoculars to enhance their viewing of particular events. Indeed, some people would have no need for a pair of binoculars, except when they are at a particular event or in a special location in which they have a particular interest and, therefore, wish to have an enhanced view through the use of a pair of binoculars. For instance, a sports fan might have interest in several different spectator sports but only have a desire to use a pair of binoculars to watch portions of one particular sport. An example of such a situation might be an individual who enjoys watching baseball from the first or third base line without the help of a pair of binoculars, but wants to have an enhanced view of his favorite horse as it rounds the turn into the backstretch which might be more than a quarter of a mile away from the spectator seat at a large racetrack. Patrons of concert halls and observation decks would also like to use binoculars from time to time. Other people would like to have an enhanced view of other things, whether it is an event or a view of a skyline. If they could expect a pair of binoculars to be available for their use at each event or location, they would use binoculars more often. This is particularly true in many of the very large ballparks, stadiums, racetracks, and the like which serve as facilities for the wide variety of spectator sporting events held throughout the world. Racing of all types provides an excellent example of a spectator sport where spectators would be greatly benefited by the presence of a pair of binoculars. In the United States, patrons of the symphony, the opera, and speaking events in concert halls, convention centers and open air facilities, or spectators watching baseball, basketball, hockey and American football which are played in indoor and outdoor facilities, field houses, sports centers, stadia, and the like are further examples of events wherein there is a need for patron or spectator viewing enhancement. Similar events are popular in Canada, along with some of the traditional European sporting events such as Rugby Football, Soccer Football, and the like which are generally played in outdoor facilities done throughout the rest of the world, especially where those games predominate. Other sporting events such as Cricket, Hurling, Australian Rules Football and the like are also popular spectator events at which spectators may have a desire to use binoculars to enhance their view. Others may just want to use a pair of binoculars to view Mt. Rushmore, Pike's Peak, or Manhattan from a distant location that affords a good view.

Accordingly, a need exists for an availability of binoculars for spectators watching spectator events so that the view of the events taking place can be enhanced by using the binoculars however provided. The present invention provides a solution to this and other problems and also offers other advantages over the prior art, and solves other problems associated therewith.

SUMMARY OF THE INVENTION

Accordingly, it is an object of the present invention to provide a convenient vending system in order to make binoculars available to patrons in spectator facilities of all kinds where spectators may wish to have the ability to enhance their view of their surroundings or of the action in the facility during specific events. In order to achieve this object, the present inventor has developed a novel binocular vending apparatus for attachment to a structure, preferably an underside of a seat bottom or a backside of seat back, and a method of vending a pair of binoculars to a spectator having access to a seat in a spectator facility. As used herein, the word facility means any facility or location having seats or standing room for spectators or patrons wishing to watch or look at either an event taking place within the view of the spectator or patron, or sight such as a natural formation, a skyline, natural events, or the like. A facility may provide seats and/or standing room for spectators or patrons of concerts, conventions, speaking events, sporting events, and the like.

It may be the deck of a cruise ship or an overlook Grand Canyon. The binocular vending apparatus of the present invention preferably comprises a pair of binoculars, housing means for removably retaining the binoculars, and a mounting plate which is attachable to a structure, preferably the underside of the seat bottom or the back side of a seat back, wherein said housing means are mountable on the mounting plate when the mounting plate is attached to the structure, preferably the underside of the seat bottom or the back side of the seat back. Preferably, the binocular vending apparatus further comprises a tether connected to said housing means, the tether also being connected to the pair of binoculars such that the binoculars are tethered to said housing means which preferably includes a housing. The housing preferably includes a receptacle for receiving and removably retaining the pair of binoculars, a retractable door which blocks normal access to the receptacle when the door is in a closed position, take-up means for retracting the tether, token accepting vending means which preferably include coded magnetic token recognition means for recognizing tokens having a magnetic code, and a take-up or reel stop mechanism for preventing said take-up means from retracting the tether when said housing means is mounted on a mounting plate attached to an underside of a seat bottom which is in a down position. As used herein, a pair of binoculars means a binocular having two interconnected ocular elements arranged so as to enhance the vision of both of an individual's eyes.

The method of vending a pair of binoculars to a patron or a spectator preferably comprises the steps of providing a mounting plate for attachment to a structure, preferably the underside of a seat bottom or the back side of a seat back, and housing means for removably retaining the pair of binoculars, wherein the binoculars are connected to said housing means by a tether; attaching said mounting plate to the structure, preferably the underside of the seat bottom or the back side of the seat back; and removably mounting said housing means on said mounting plate. The present invention also provides a vending token having a magnetic code for actuating elements of the vending machine such that the vending machine will respond in a predetermined manner to the insertion of the vending token, said token comprising a plurality of magnetic regions, wherein magnetic forces emanate from each magnetic region and each magnetic region has a polar orientation. At least one region has a south polar orientation and at least one region has a north polar orientation, wherein, by virtue of the respective forces emanating therefrom, a region having a south orientation will attract a region having a north orientation and repel a region having a south orientation, and a region having a north orientation will attract a region having a south orientation and repel a region having a north orientation.

The present invention also provides a method of providing a binocular vending or rental operation service for a facility for spectator events and the like, each facility having a plurality of seats, each seat having a seat bottom and/or seat back, and each seat bottom having an underside and each seat back having a back side. The method comprises the steps of: providing a plurality of binocular vending machines, each vending machine having a pair of binoculars tethered thereto and removably contained therein; attaching individual mounting plates to a percentage of said seats, preferably to the underside and/or the back side of each of a percentage of the plurality of seats; and removably and individually mounting a percentage of the plurality of binocular vending machines on a plurality of the mounting plates such that binocular vending machines will be available to patrons or spectators for a first period of time at a first number seat locations. Preferably, the method will further comprise the step of dismounting a percentage of the binocular vending machines mounted on the attached mounting plates, and subsequently individually mounting a percentage of the vending machines removed thereby on mounting plates attached to different seats. In preferred embodiments, additional vending machines can be removably and individually mounted in order to increase the number of vending machines available to spectators in the facility for specific events.

It will be appreciated that the apparatus and the method of the present invention provide solutions for the needs for view enhancing equipment, preferably binoculars, for spectators or patrons of a spectator facility wishing to enhance their view of specific events occurring in such spectator facilities. As used herein, the word "facility" means any spectator facility, whether providing seating or otherwise, including but not limited to, theaters, opera houses, convention centers, music halls, racetracks, stadiums, ballparks, field houses, sports centers, and the like. The word "vending", as used herein to modify the words "system", "apparatus", "machine", "token", and "mechanism", is used primarily in the sense that the item being vended is available for use on a rental basis and preferably means that the item being vended, in the preferred embodiment, a view enhancing device, preferably a pair of binoculars, is available for use on a rental basis at the location of the item being vended. It is to be understood, however, that the word "vending" can also include the broad meaning generally ascribed to the word "vending". As used herein, "binoculars" and "a pair of binoculars", are equivalent terms and are used interchangeably. Binoculars are expressly defined to include any view enhancing equipment which can be used to improve a spectator's view of a sight or of events.

These and various other advantages and features of novelty which characterize the present invention are pointed out with particularity in the claims annexed hereto and forming a part hereof. However, for a better understanding of the present invention, its advantages and other objects obtained by its use, reference should be made to the drawings which form a further part hereof and to the accompanying descriptive matter, in which there is illustrated and described preferred embodiments of the present invention.

BRIEF DESCRIPTION OF THE DRAWINGS

In the drawings, in which like reference numerals indicate corresponding parts of preferred embodiments of the present invention throughout the several views.

FIG. 9 is a perspective view of the apparatus shown in FIG. 1 when the housing is disconnected from a mounting plate of the vending apparatus;

FIG. 10 is a top plan view of a token in accordance with the present invention showing boundary lines between different magnetic regions in phantom;

FIG. 11 is a sectional view of the token shown in FIG. 10 as seen from the line 11—11;

FIG. 13 is a side elevational view of the apparatus shown in FIG. 1 wherein an outer shell of the housing has been removed; FIG. 14 is a diagrammatic plan view showing a representation of the different magnetic recognition regions of a magnetic token recognition member which is shown in hidden lines in FIG. 13;

FIG. 15 is a sectional view taken generally along line 15—15 of FIG. 13;

FIG. 23 is a diagrammatic right side view of the take-up locking mechanism of the apparatus shown in FIG. 12 when the pivotal facility seat bottom is in an upright position;

FIG. 24 is a diagrammatic right side view of main elements of the take-up locking mechanism shown in FIG. 23 when the pivotal facility seat bottom (not shown) is in a down position; FIG. 25 is an enlarged fragmentary perspective view of the take-up locking mechanism as shown from below a take-up reel as a locking pin is engaged therewith;

DETAILED DESCRIPTION OF THE PREFERRED EMBODIMENTS OF THE PRESENT INVENTION

Figure 1:
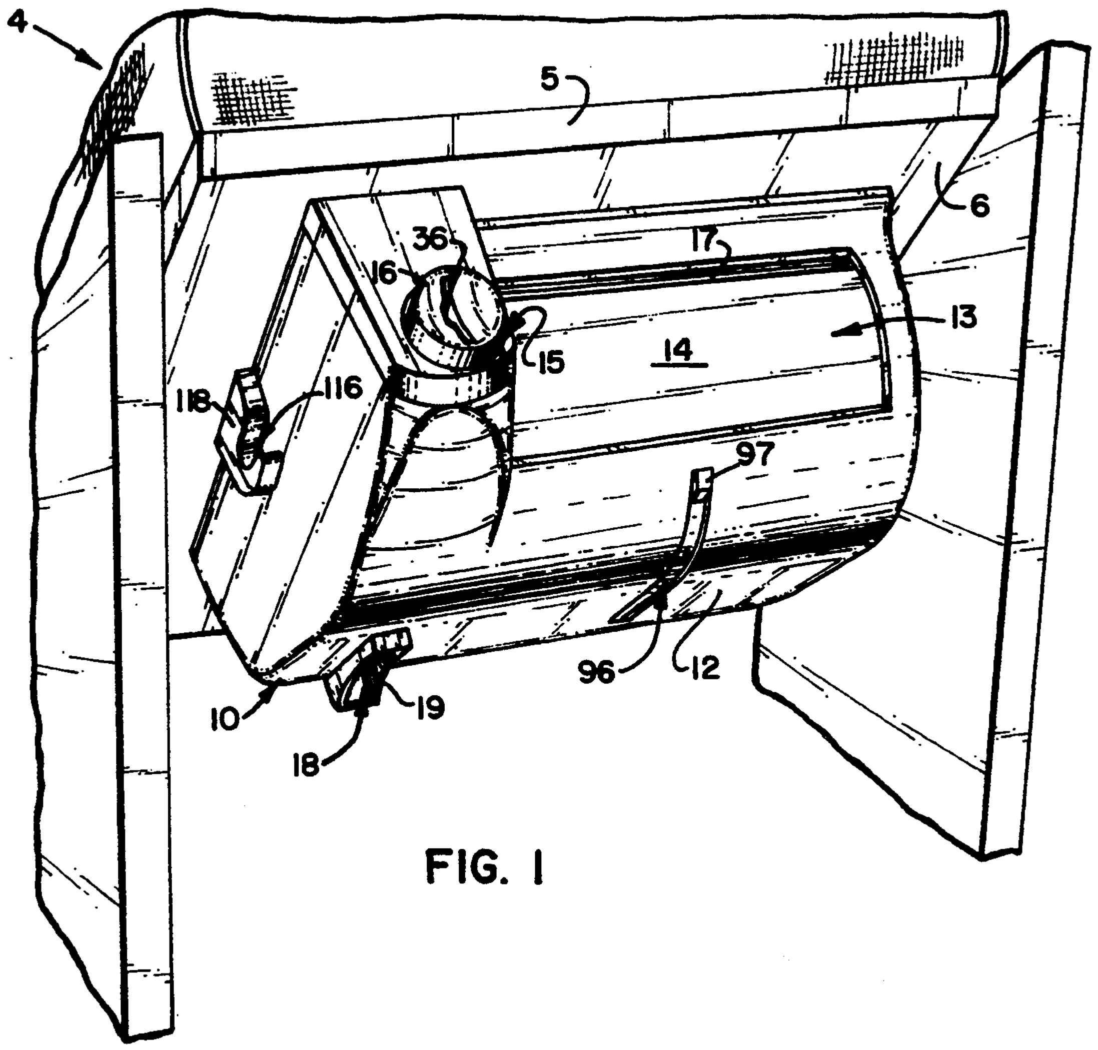
FIG. 1 is a front and left side perspective view of a binocular vending housing of a binocular vending apparatus in accordance with the present invention as seen when attached to an underside of an object simulating a pivotal facility seat bottom.
Figure 2:
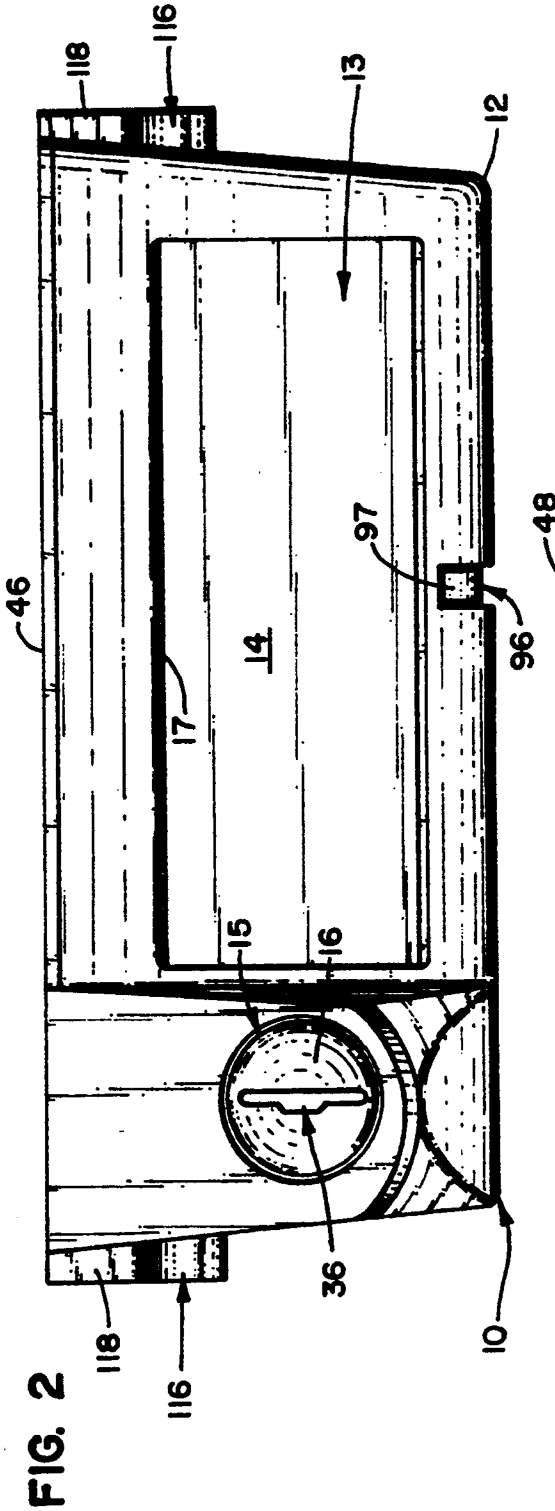
FIG. 2 is a front elevational view of the binocular vending housing shown in FIG. 1.
Figure 3:
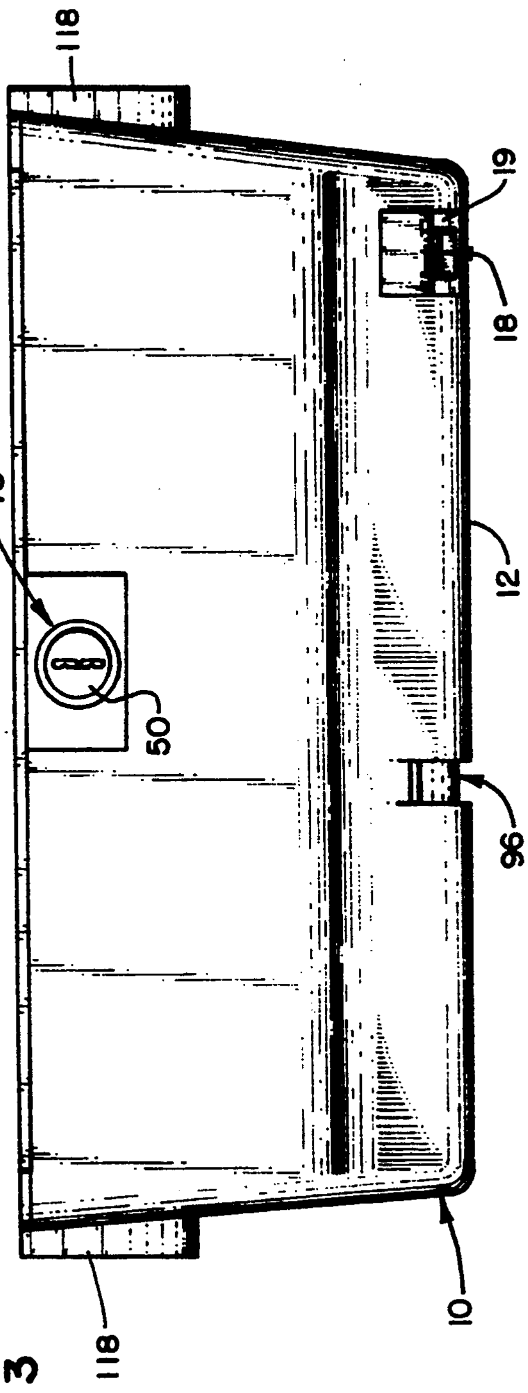
FIG. 3 is a rear elevational view of the binocular vending housing shown in FIG. 1.
Figure 4:
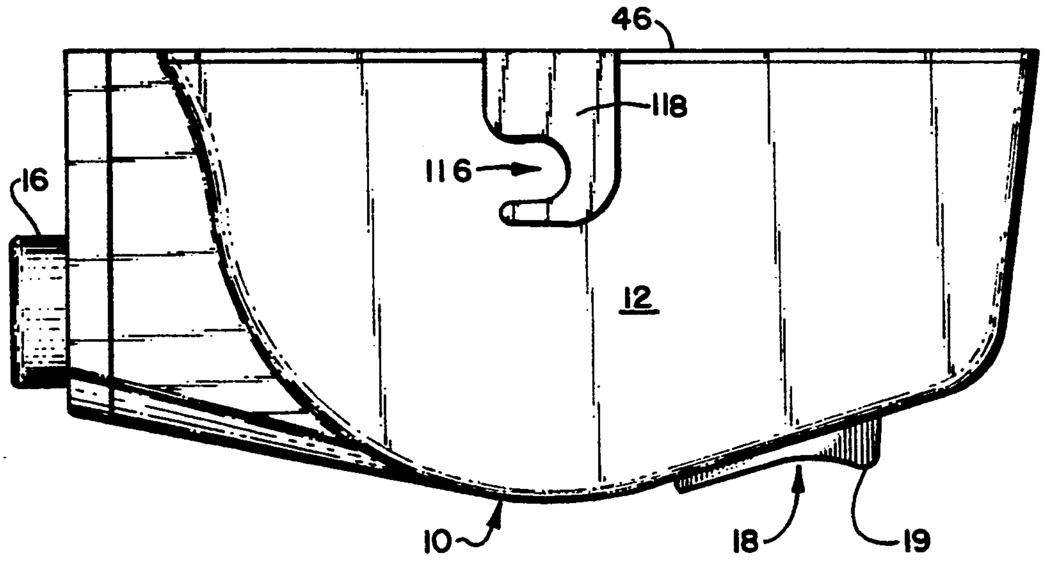
FIG. 4 is a right side elevational view of the binocular vending housing shown in FIG. 1.
Figure 5:
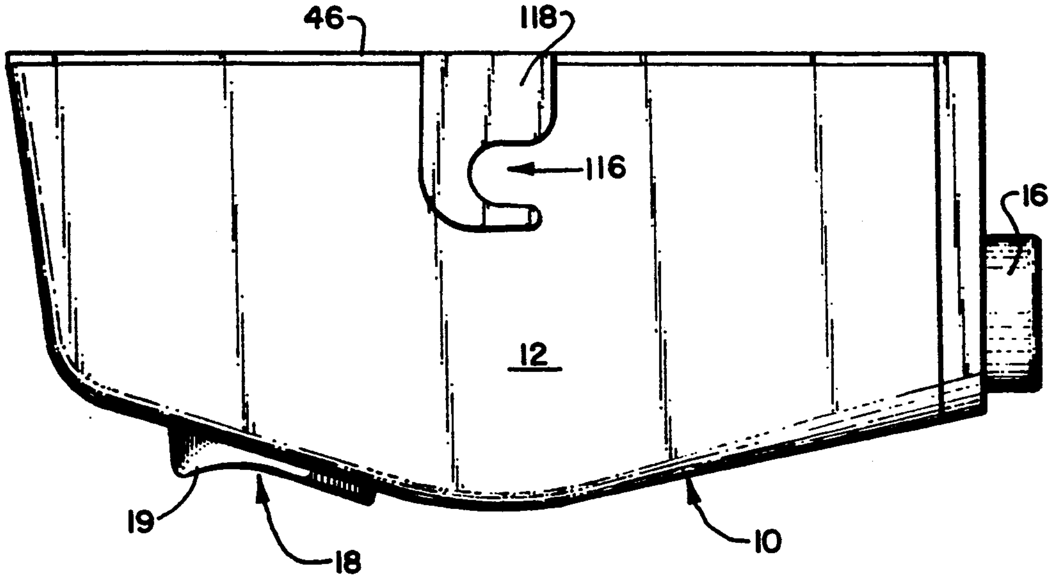
FIG. 5 is a left side elevational view of the binocular vending housing shown in FIG. 1.

Referring now to the drawings, and to FIGS. 1–8 in particular, a binocular vending apparatus 2 for an attachment to a structure, preferably an underside 6 of a seat bottom 5 is shown in FIG. 1. The binocular vending apparatus 2 includes a binocular vending machine or a housing 10. As shown in FIGS. 1–8, the vending machine or housing 10 includes an outer shell 12, a retractable receptacle door 14 and a token receiving door release button 16. The outer shell 12 includes a receptacle door opening 13, an opening 15 for the door release button 16, a coin release slot 18 and raised portion 19 surrounding the slot 18. The retractable receptacle door 14 includes an upper lip 17.

Figure 8:
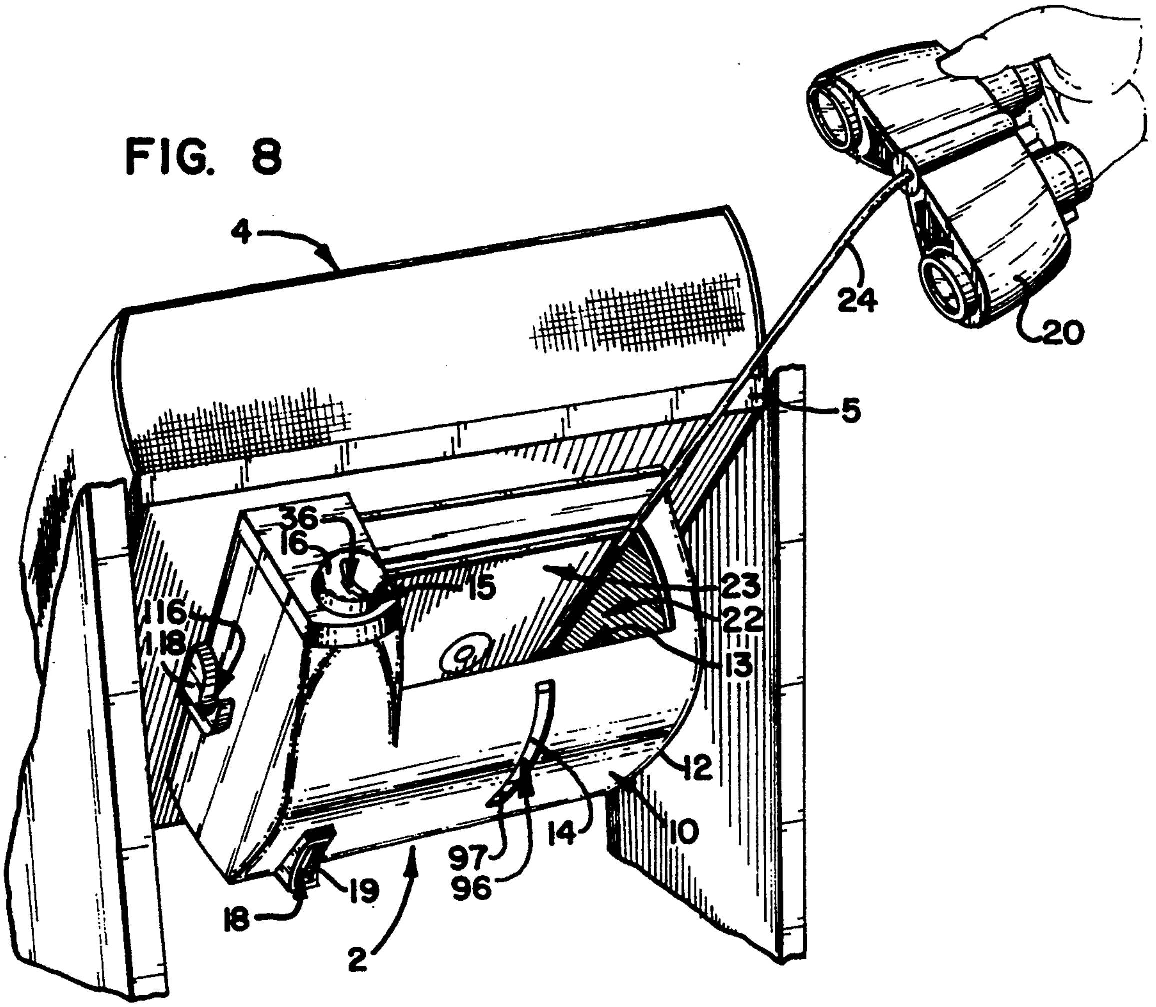
FIG. 8 is a front and left side perspective view of the binocular vending apparatus shown in FIG. 1 showing a pair of binoculars connected to the binocular vending housing attached to the underside of the object simulating a pivotal seat bottom in an upright position.

Referring now specifically to FIG. 8, the binocular vending apparatus 2 also includes a pair of binoculars 20. The binoculars 20 are removably retained in a binocular receptacle 22 partially defined by a binocular receptacle box 23 in the vending machine or housing 10. The binoculars 20 are connected to an elongated tether 24, preferably a Teflon TM coated cable, preferably a steel cable, which is connected to the housing 10 such that the binoculars 20 are tethered to the housing 10. The retractable receptacle door 14 blocks normal access to the binoculars 20 in the binocular receptacle 22 when the binoculars 20 are in the receptacle 22 and the retractable door 14 is in a closed position as shown in FIG. 1.

Figure 26:
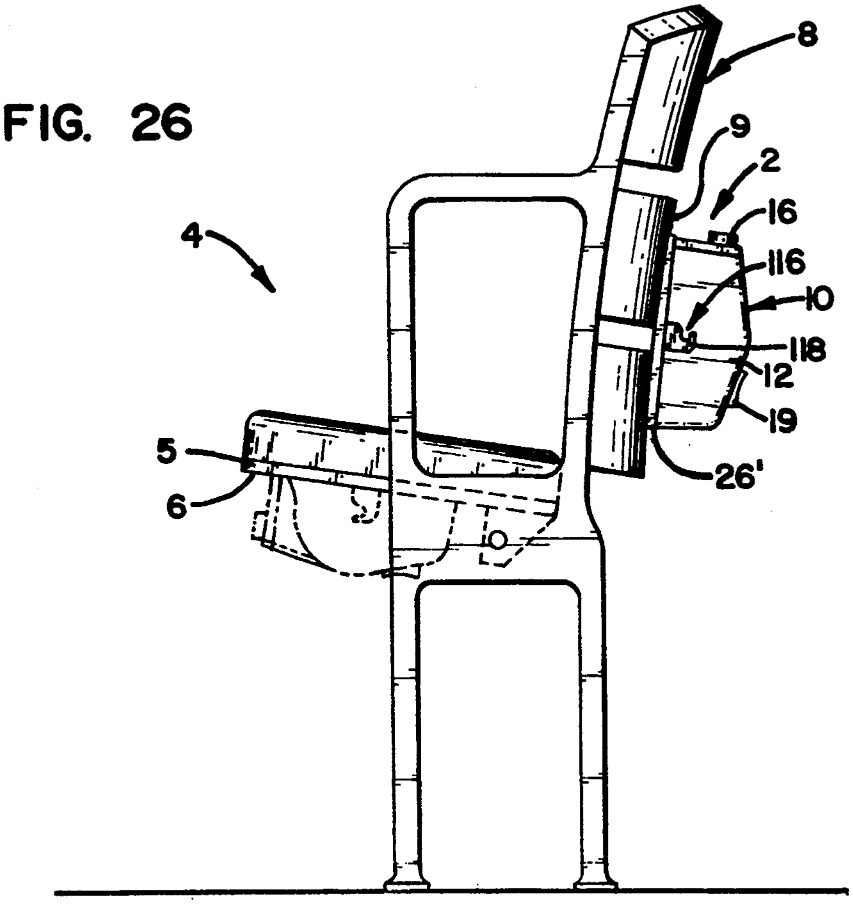
FIG. 26 is a side view of a facility seat showing the vending machine shown in FIG. 1 mounted on an alternate mounting plate attached to a back side of a seat back and the vending apparatus of FIG. 1 shown in phantom attached to the pivotal seat bottom.
Figure 27:
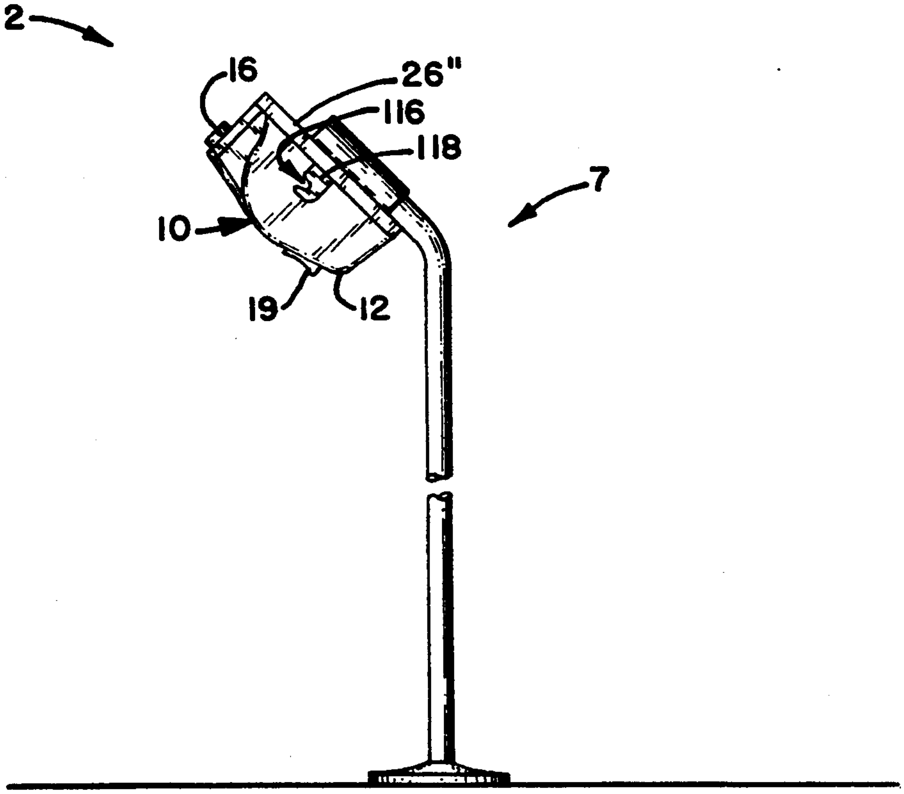
FIG. 27 is a side view of the vending machine shown in FIG. 1 mounted on an alternate mounting plate attached to a pedestal.

Referring now also to FIGS. 9, 10 and 11, the binocular vending apparatus 2 also includes a mounting plate which can be attached to the underside 6 of the seat bottom 5. The mounting plate 26 preferably has a substantially flat housing interface surface 28, but the opposite surface (not shown) which interfaces with the underside 6 of the seat bottom 5 may have any conceivable size, shape, composition, or the like, which will enhance the interface with the seat bottom such that the mounting plate 26 remains firmly attached thereto. It will be appreciated that the mounting plate 26 may be bonded, fastened, clamped, integrally formed with the seat bottom 5, or the like. Preferably, the seat bottom 5 to which the mounting plate 26 is attached is a pivotal facility seat bottom which is spring biased such that it will rise to an upright position when no one is sitting on the upper side (not shown) of the seat bottom. In preferred embodiments wherein a plurality of mounting plates are provided or attached to seat bottoms in one or more facilities, the housing interface surface 28 will be a universal surface. Alternate embodiments of the mounting plate, see e.g. mounting plates 26' and 26" for attachment to a backside 9 of a seat back 8 and to a pedestal 7, respectively as shown in FIGS. 26 and 27, will preferably have the same features as the housing interface surface 28 of the plate 26 shown in FIG. 9. The other features, particularly those related to the interface with the structure will be varied from structure to structure as required.

The vending machine or housing 10 also includes a take-up mechanism 30 including a take-up reel 32 to which the tether 24 is connected. The take-up reel 32 is spring biased so that it can take up the slack in the tether 24 when the tether is unrestrained and, preferably, when the seat bottom 5 is in an upright position as shown in FIG. 8. Therefore, when the binoculars 20 are returned to the binocular receptacle 22, the tether 24 is gathered or wound up upon the take-up reel 32.

In its general operation, the binocular vending apparatus 2 is ready for vending binoculars 20 to spectators in spectator facilities when the tether 24 is taken up on the take-up reel 32, the binoculars 20 are in the binocular receptacle 22, the retractable receptacle door 14 is in a closed position and the housing or vending machine 10 is mounted on the mounting plate 26 or 26' which is attached either (see FIG. 26), to an underside 6 of a seat bottom 5 which is preferably pivotal such that the vending machine 10 can be easily accessed when the seat bottom 5 is in an upright position, or to a back side 9 of a seat back which is generally in an upright, i.e. substantially vertical, position. Alternately, this machine 10 can be mounted on a mounting plate 26" attached to a pedestal 7 (see FIG. 27) in areas for standing room only. As the spectator or patron comes to the facility, the patron will have an opportunity to purchase a token 34 from a token vendor or a token vending machine in the facility. In order to obtain access to the binoculars 20 in the vending machine 10, the patron inserts the token 34 into a token receiving slot 36 in the token receiving door release button 16. After the token 34 has been inserted into the vending machine 10 via the token receiving slot 36, the door release button 16 is depressed, thereby actuating a latch member 64 (See FIG. 13) to release the retractable receptacle door 14 which is spring biased so that it moves from the closed position shown in FIG. 1 to an open position shown in FIG. 8 wherein the binoculars 20 are easily accessible in the binocular receptacle 22. The patron can then reach into the receptacle 22 and remove the tethered binoculars 20, thereby withdrawing the tether 24 from the housing 10 as the binoculars 20 are withdrawn. The preferred embodiment of the vending machine 10 mounted on a pivotal seat bottom 5 includes a reel stop mechanism 38 (shown generally in FIGS. 23–25). As further explained herein below, the reel stop mechanism 38 acts to prevent the spring biased take-up reel 32 from retracting the tether 24 when the tether is withdrawn and the pivotal seat bottom 5 is in a down position as shown diagrammatically in FIG. 24. This enables the patron to use the binoculars 20 without having to also strain against the tether 24 and the force of the spring biasing effect upon the take-up reel 32. A reel stop mechanism (not shown) can also be provided for the machines 10 attached to other structures but these mechanisms would have different features, including latch mechanisms and the like.

The tokens have a magnetic code for actuating elements of the vending machine 10. They are preferably constructed of rubber bonded barium ferrite composite materials such as Plastalloy TM flexible permanent magnets from Electrodyne, Inc. (Batavia, Ohio) preferably having a rubber base of polyisoprene, acrylic nitrile, or the like. It will be appreciated, however, that any suitable magnetic materials which are known in the art can be used to make the tokens. Each token 34 includes an outer skin 33 and a plurality of magnetic regions 34*a*, 34*b*, 34*c*, and 34*d* having alternating magnetic pole orientations. The token 34 is round and has a small round, raised center 35 which makes it impossible to insert the token 34 in the token receiving slot 36 which has a reciprocal shape, unless the raised center 35 is oriented to the left side of the token 34 when the token 34 is inserted into the slot 36. It will be appreciated that the slot 36 can be oriented in any other way in alternate embodiments and is only oriented in this way here to align the slot 36 with the slotted path 56 in a predetermined manner (see below). This ensures that the token 34 is in the correct orientation with respect to the elements of the vending mechanism 40 in the interior of the vending machine 10 so that the magnetic field or magnetic forces emanating from the token 34 can actuate elements of the vending mechanism 40 in a predetermined manner, enabling the patron to open the retractable door 14 by depressing the door release button 16 after the magnetic token 34 is inserted therein.

It will be appreciated that the token may include any number of magnetic regions in any size, shape, order or arrangement which can be joined together in a practical manner and still present a well defined magnetic code which can be recognized by a reciprocating device or member. The respective magnetic regions, and any nonmagnetic portions of the token 34 are preferably joined together with an adhesive, preferably a high-tack pressure sensitive adhesive. The tokens 34 are relatively expensive when compared to the fee assessed the patron for obtaining a token 34 to access a pair of binoculars 20 in the vending machine 10. The token will generally cost between about 10–200 percent, preferably about 25–100 percent, and preferably about 50 percent of the binocular rental fee so that it is not practical to counterfeit the magnetic coded tokens 34 and still obtain a reasonable return for such illicit activities.

The binoculars 20 are preferably good binoculars which provide the patron or spectator with a good view of the events taking place in the respective facility, racetrack, sports center or the like. The binoculars preferably are 7 power×50 millimeter (7×50). It will be appreciated that any other binoculars can be provided, for instance, 5×25, or 8×55 can also be used. Low power binoculars are often ideal for the opera, concerts, speaking events, and the like. However, the lower power binoculars (e.g. 5×25) often do not magnify close enough to satisfy the patrons in large sporting facilities, while the higher power binoculars magnify so much that a patron may find them difficult to use because small vibrations tend to cause the focal point to vary sharply. Normally, an enhanced viewing device having a power of more than 8, requires a tripod or the like to enable the normal user to use it for purposes envisioned by the present invention. Therefore, a power greater than 8 is not considered to be particularly functional even for sporting events or the like.

The tether 24 can by any suitable cord or elongated strand-like member, but is preferably a stainless steel cable having a polymeric coating, preferably a Teflon TM coating. The coating is provided for two reasons. One, so that the stainless steel cable does not fray and damage a patron's clothing, and two, the polymeric coating wears and cleans easily. The Teflon TM coating is preferred over a nylon coating, which might also be used, because Teflon TM is expected to wear better and clean easier.

Figure 12:
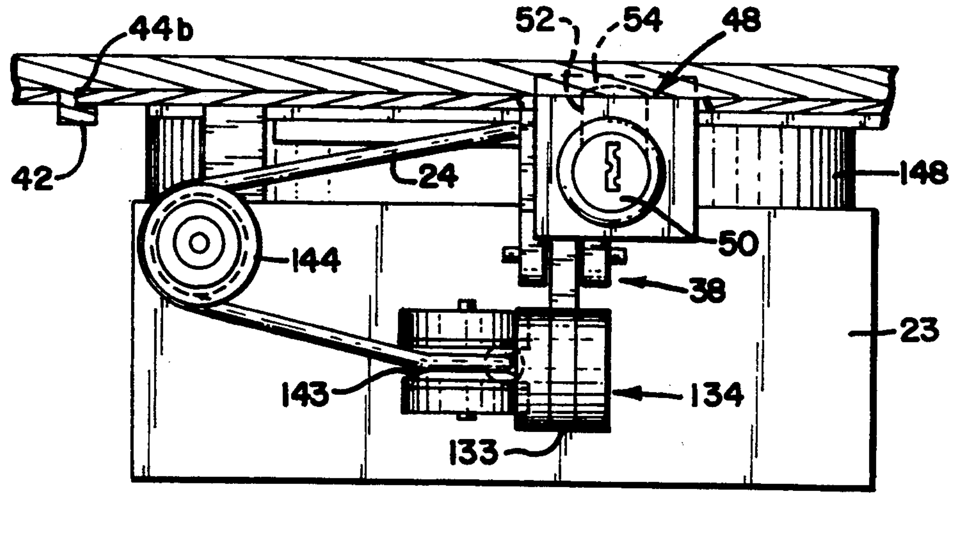
FIG. 12 is a partial rear elevational view of portions of the vending apparatus shown in FIG. 9 when the housing is mounted on the mounting plate.

Referring now also to FIG. 12, which is an elevated rear view of the vending machine 10 when the outer shell 12 has been partially cut away, the interaction of the vending machine 10 and the mounting plate 26 can be more fully understood. The mounting plate 26 includes 4 L-shaped extension hooks 42 (See FIG. 9) which can be received in mounting plate receiving openings 44 in a back plate 46 which is connected to the outer shell 12 of the vending machine 10. When the vending machine 10 is mounted on the mounting plate 26, the L-shaped extension hooks 42 are inserted into the enlarged portions 44*a* of the mounting plate receiving openings 44 and the vending machine 10 is slipped down on the extension hooks 42 such that the extension hooks 42 are restrained by the back plate 46 proximate the narrow portions 44*a* of the respective mounting plate receiving openings 44. When the vending machine 10 is thus engaged on the mounting plate 26, a lock mechanism 48 is used to hold the vending machine 10 in place on the mounting plate 26. A key (not shown) is used to turn the lock 50 and thereby raise a lock arm 52 which enters a lock arm receiving recess 54 and extends into the plane occupied by the mounting plate 26. When the lock arm 52 extends upward into the lock arm receiving recess 54 the lock arm 52 is in a locked position and the vending machine 10 is locked in position on the mounting plate 26 and cannot be removed without damaging elements of the vending apparatus 2.

The general operation of the vending mechanism 40 is shown generally in FIGS. 13–19. It is housed within the vending machine or housing 10 and includes a token accepting mechanism 66. The token accepting mechanism 66 includes a token accepting mechanism housing 82 and a slotted path 56 at least partially defined by left and right lateral side walls 86*a* and 86*b* which are interconnected such that they are able to slide back and forth together within the housing 82. Referring now to FIGS. 13–16, the vending machine 10 is operated by inserting a token 34 into the token accepting mechanism 66 such that the raised center 35 is oriented to the left of the token 34 as the token 34 faces the vending machine 10. When the token 34 is inserted into the token receiving slot 36, the seat bottom 5, to which the vending machine 10 is interconnected is preferably in an upright position. When the seat bottom 5 is in such a position, the force of gravity will carry the token 34 to a first position (as occupied by the token 34 shown in hidden lines inside of the vending machine 10 shown in FIG. 13). The token is received by the slotted path 56 which communicates with the token receiving slot 36 in the door release button 16. When the token 34 is in the first position in the slotted path 56 (shown in FIG. 13) the magnetic field emanating from the token 34 attracts a first magnetic arm 58 which includes a first magnetic recognition member 60 which has a magnetic coding which reciprocates the magnetic coding of the token 34 such that the magnetic member 60 is attracted to the token 34. The first magnetic arm 58 is pivotally connected to the left lateral side wall 86*a* by a first arm pin 59. In FIG. 15 the position of the first magnetic arm 58 is shown in phantom as it would be before the token 34 is present in the first position shown in FIG. 13. The first magnetic arm 58 is biased slightly away from the slotted path 56 such that an extension rod 62 extending from an upper end 58*a* of the first magnetic arm 58 is set back from a vertical plane through which a latch member 64, designed to latch and restrain the retractable receptacle door 14 pivots. When the token 34 is in the first position shown in FIG. 13, the first magnetic arm 58 is attracted to the token 34 by virtue of the recognition or complementary magnetic fields of the magnetic member 60 and the token 34 which attract one another. When the first magnetic arm 58 is attracted to the token 34 residing in the first position, the extension rod 62 is moved so that its distal end 62*a* resides in the vertical plane through which the latch member 64 pivots. Once the token 34 has actuated the movement of the first arm member 58 and the extension rod 62, the token accepting mechanism 66, which includes the slotted path 56 and the door release button 16, can be depressed to release the retractable door 14. The first magnetic arm 58 is connected to the left lateral sidewall 86*a* which slides back and forth in the token accepting mechanism housing 82 when the door release button 16 is depressed and released. A biasing spring 88, interconnected with the token accepting mechanism housing 82 and the left lateral sidewall 86*a*, resists the force necessary to depress the button 16 and urges the button to return to a stable position shown in FIG. 13. When the door release button 16 is depressed, and the token 34 is in the first position, the extension rod 62 of the first magnetic arm 58 pushes against a latch arm 67 of the pivotal latch member 64 and the latch member 64 pivots on a latch pin 69 thereby disengaging the retractable door 14 from the latch portion 68 of the latch member 64. The latch pin 69 interconnects the latch member 64 with the receptacle box 23. When the latch member 64 pivots on the latch pin 69, the retractable door 14, previously in a closed position, moves to an open position within the vending machine 10 (shown in FIGS. 17–19), because the door 14 is biased toward the open position by door springs 70 which interconnect the lateral side members 76*a* (right side not shown) of the receptacle door 14 with the respective sides of the receptacle box 23.

Figure 17:
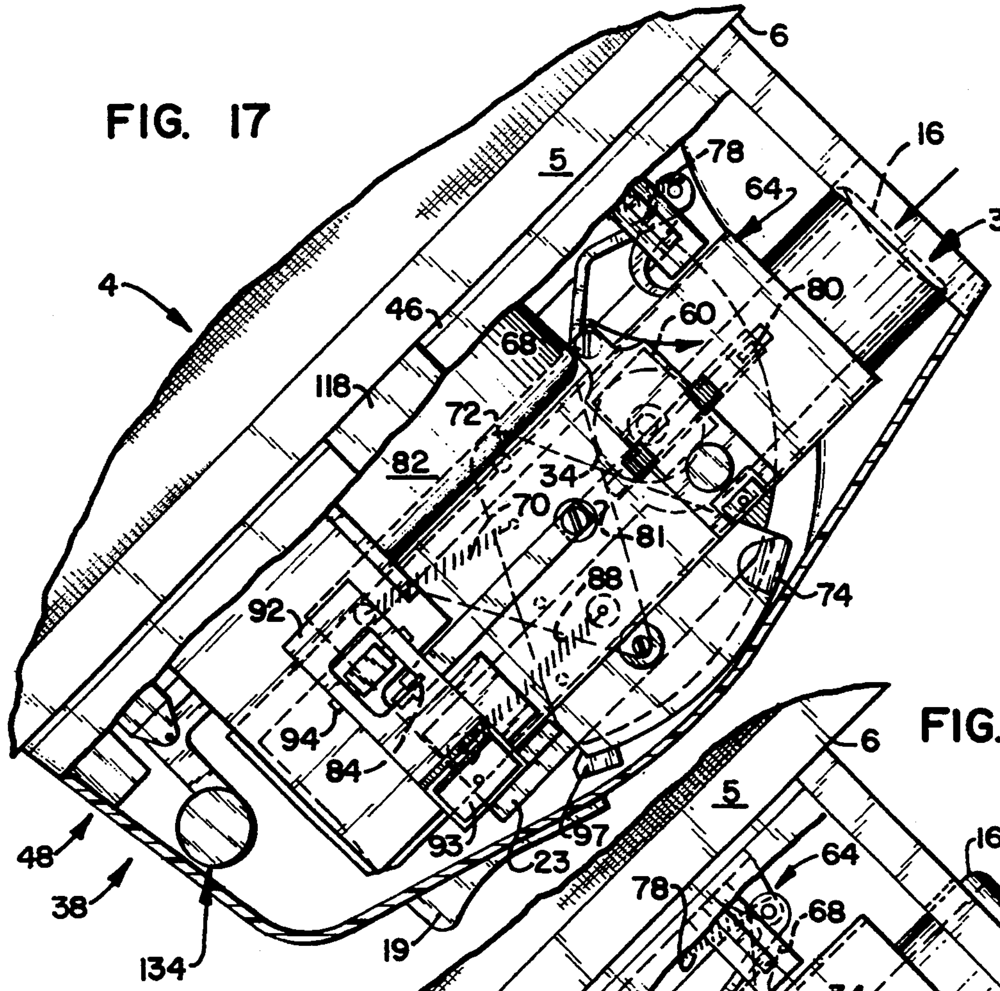
FIG. 17 is a side elevational view of the apparatus shown in FIG. 13 when the retractable door release button is in a depressed and a retractable receptacle door is in an unbiased, unlatched position.
Figure 18:
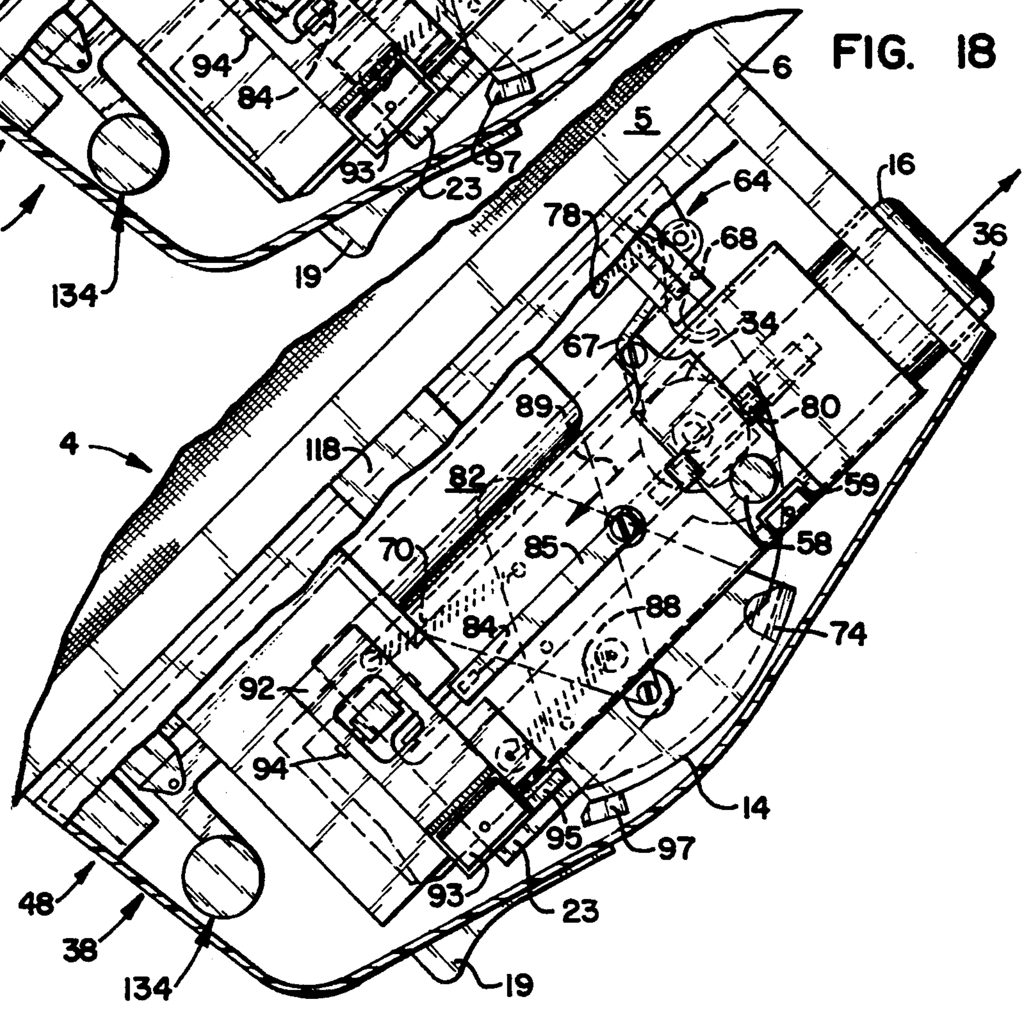
FIG. 18 is a side elevational view as shown in FIG. 17 wherein the door release button is shown returning to an unbiased position from the depressed position shown in FIG. 17.
Figure 19:
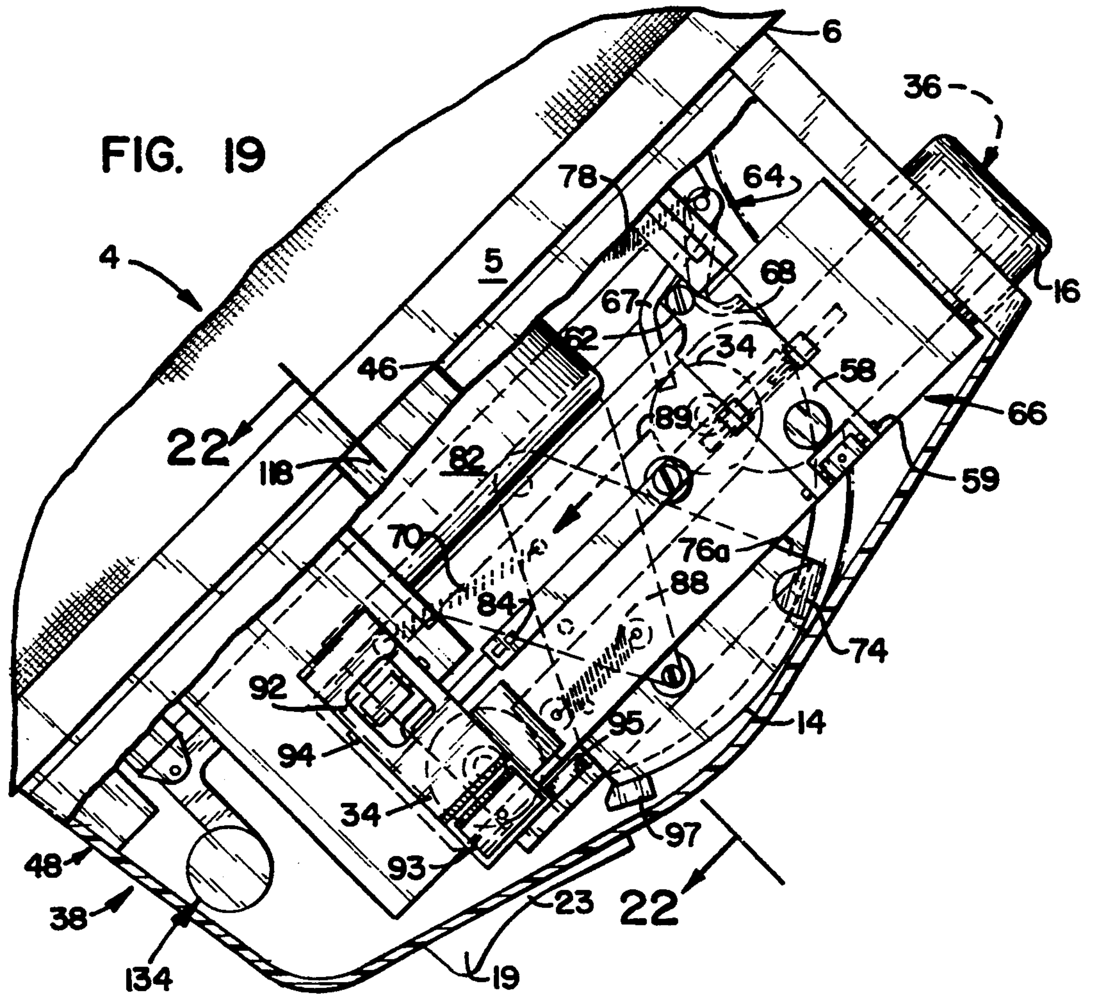
FIG. 19 is a side elevational view as shown in FIG. 13 after the button has returned to an unbiased position from the depressed position shown in FIG. 17.

The retractable receptacle door 14 is pivotally attached to the binocular receptacle box 23 by receptacle door pins 72 on each side of the binocular receptacle box 23. When the door 14 is disengaged by the latch portion 68 of the latch member 64, the door 14 pivots on the door pins 72 so that the door 14 is retracted into the housing 10 under the biasing effect of the door springs 70 on both sides of the binocular receptacle box 23. The door 14 stops when it comes into contact with the box 23 under the binocular receptacle 22. The latch member 64 includes the latch arm 67 and the latch portion 68 and is spring biased toward the first position shown in FIG. 13 by a spring 78 which is attached to the latch member 64 and the box 23 as shown in FIG. 13. When the retractable door 14 is in the closed position shown in FIG. 13, the latch portion 68 of the latch member 64 is engaged with a raised lateral extension 74 of the left lateral side member 76*a* of the receptacle door 14. The raised lateral extension 74 is designed to reciprocate the shape of the latch portion 68. However, when the latch arm 67 is pushed by the extension rod 62 of the first magnetic arm 58, when the token receiving door release button 16 is depressed as shown in FIG. 17, the latch member 64 pivots on the latch pin 69 and the latch portion 68 is disengaged from the raised lateral extension 74. Because the receptacle door 14 is biased toward the open position, as shown in FIG. 17, the receptacle door 14 opens when the latch member 64 pivots and the lateral extension 74 is released or disengaged from the latch portion 68.

Figure 16:
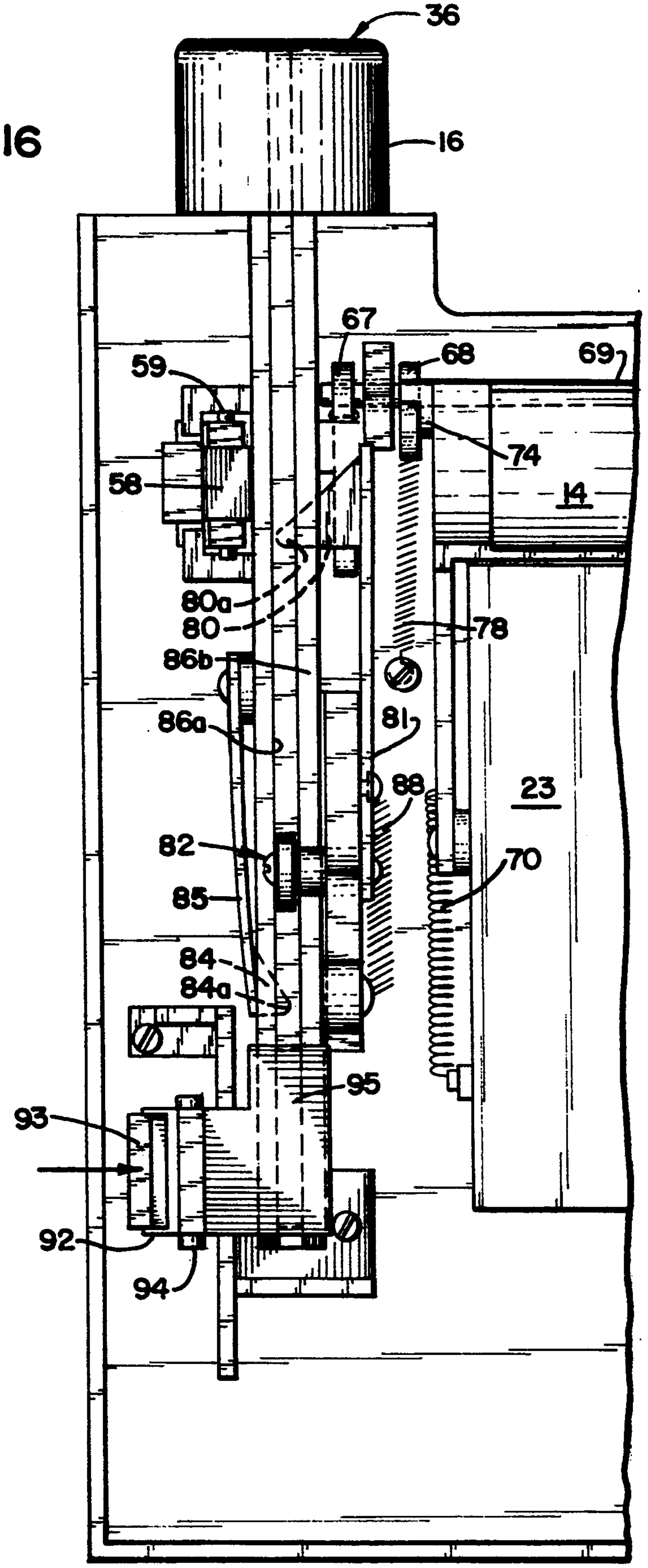
FIG. 16 is a bottom plan view of the apparatus shown in FIG. 13.

Referring now also to FIGS. 17–22, the subsequent operation of the token accepting mechanism 66 are discussed. In FIG. 16 the slotted path 56 is shown in a bottom plan view. The path 56 is partially obstructed first by a first catch member 80 which extends from a first biasing arm 81, and second, by second catch member 84 which extends from a second biasing arm 85. The biasing arms 81 and 85 are both somewhat flexible so that, as the token 34 passes by the respective catch member 80 or 84 toward the rear of the housing 10, the respective biasing arm 81 or 85 can be pushed slightly away from the slotted path 56 so as to allow the token 34 to pass down the path 56 away from the door release button 16. Once the token 34 has passed beyond either of the respective catch members 80 or 84, the token 34 is not able to come back past the respective catch member 80 or 84, in the direction of the button 16, because the respective catch members 80 and 84 prevent the token 34 from returning.

When the door release button 16 is depressed, the entire slotted path 56 is depressed and slides toward the rear of the vending machine 10 within the token accepting mechanism housing 82 which is interconnected with the back plate 46. This movement carries the token 34 from the first token position shown in FIG. 13, wherein a first tip 80*a* of the first catch member 80 is slightly displaced from the position shown in FIG. 16 and rests against the token 34 in the slot 56, to a second token position shown in FIG. 17, wherein the first tip 80*a* no longer rests upon the token 34 and is no longer displaced. The movement of the lateral sidewalls 86*a* and 86*b* toward the rear of the vending machine 10 within the token accepting mechanism housing 82 is resisted by a biasing spring 88 attached to the token accepting mechanism housing 82 and the left lateral side 86*a* laterally of the slotted path 56. When the door release button 16 is depressed as shown in FIG. 17, the biasing spring 88 elongates, thereby resisting the movement of the lateral sidewalls 86a and 86b. When the door release button 16 is subsequently released from the depressed position shown in FIG. 17, the biasing effect of the spring 88 urges the lateral sidewalls 86a and 86b and the door release button 16 to return to the stable position shown in FIG. 13. However, when the sidewalls 86 are in the process of returning to the stable position, the token 34 is unable to pass by the first catch member 80, and the catch member 80 forces the token 34 further down the path 56 and allows gravity to carry it further in the direction shown by the broken arrow 89. As the token 34 continues down the slotted path 56 under the force of gravity, it displaces the tip 84a of the second catch member 84 as it passes by, falls out of the slotted path 56 and into a token receptacle area 90, and occupies a third token position (shown in FIG. 19 by the token 34 to the rear of the housing 10). Once the token 34 is in the token receptacle area 90, the token 34 is unable to go back through the slotted path 56 to the button 16 or the first token position, because the second catch member 84 will obstruct its path.

Figure 20:
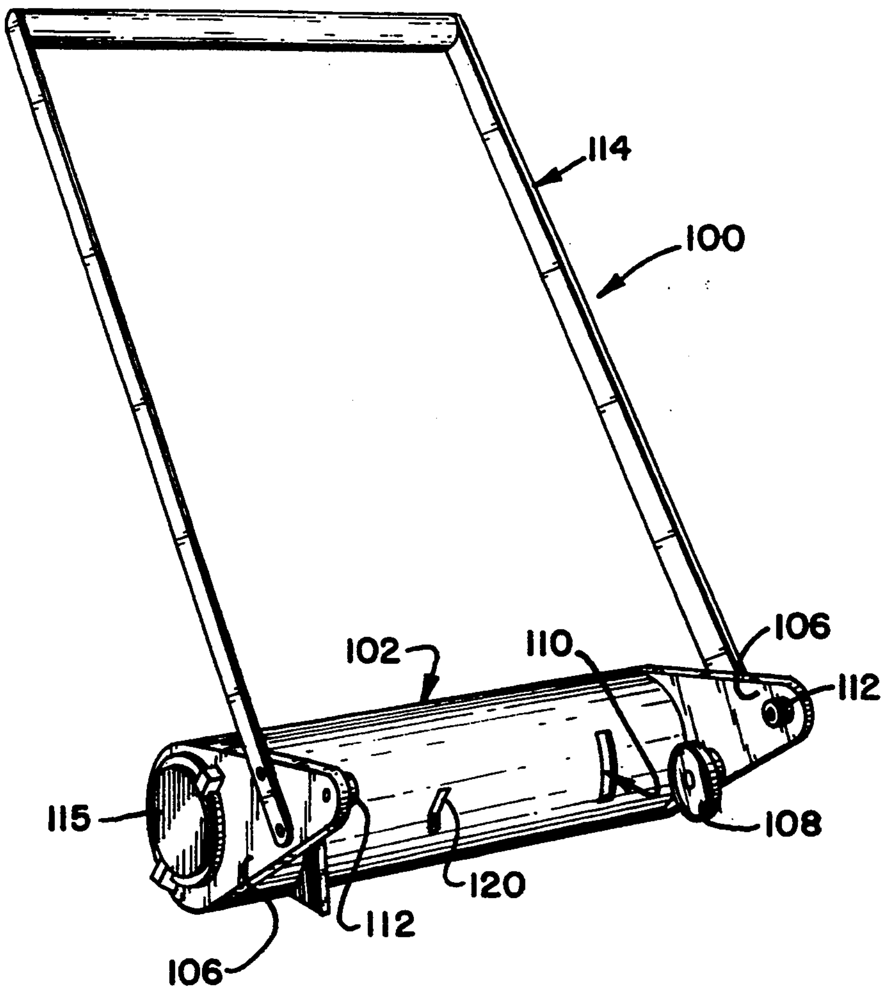
FIG. 20 is a perspective view of a banking device in accordance with the present invention for collecting tokens from the apparatus shown in FIG. 1.
Figure 21:
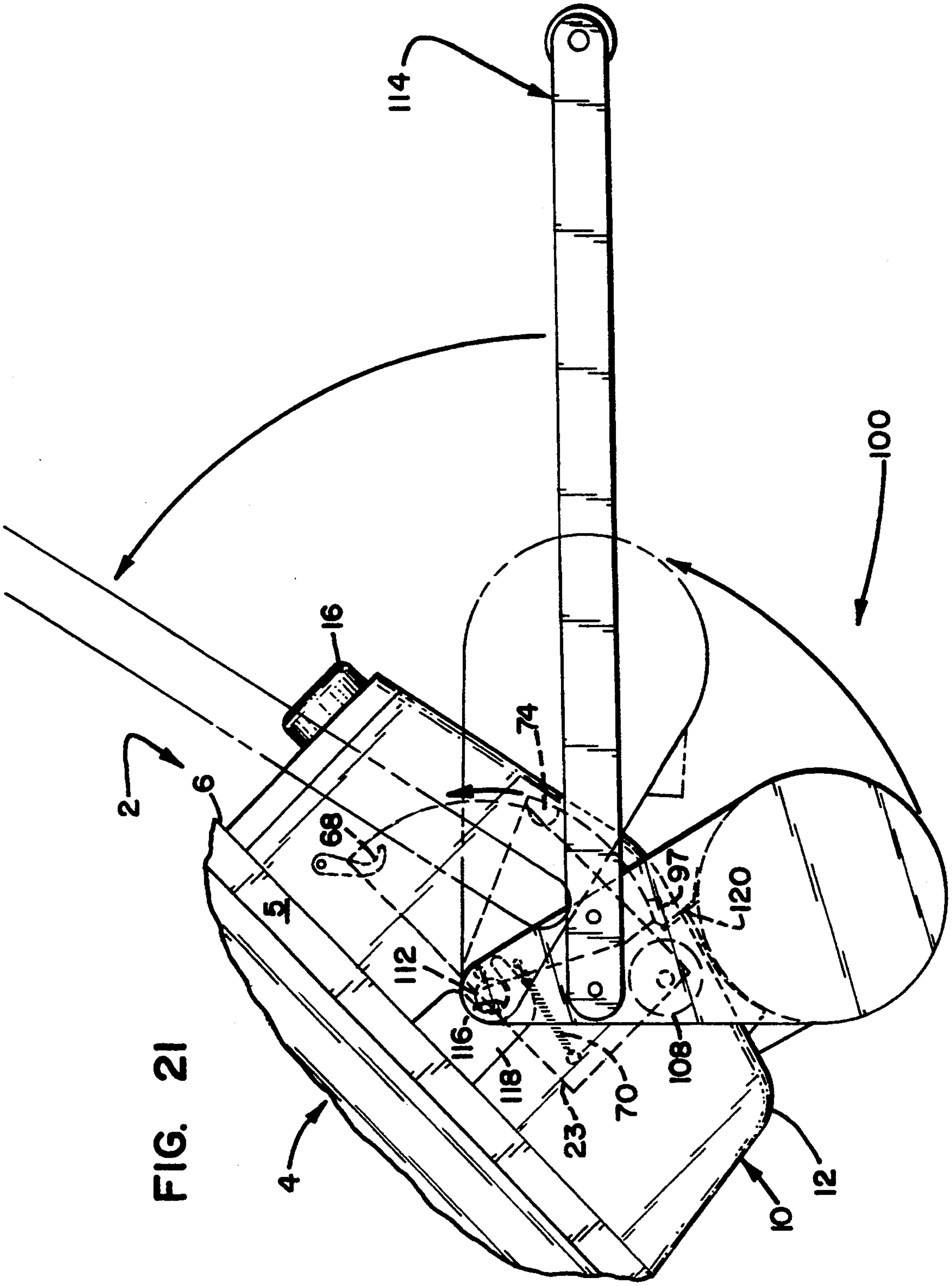
FIG. 21 is a side-elevational view of the banking device shown in FIG. 20 when engaged with the binocular vending apparatus shown in FIG. 5.

Referring now also to FIGS. 20–21, the present invention also provides a banking device 100. The banking device 100 is used during the servicing of the vending machines 10 to collect the tokens 34 and to close the receptacle doors 14 of each of the vending machines 10 in the facility or sporting facility after the vending machines have been by a patron. After the event, employees of the entity that services the vending machines 10 will go through the facility and return the binoculars 20 to the binocular receptacle 22 of each of the vending machines 10. The employee will make sure that the vending machines 10 are in order and that they are clean so that the next patron will not have any complaints. Preferably, this employee will add a complimentary polishing cloth to the receptacle 22 so that the patron will have a cloth to clean the binoculars 20 after they are removed from the binocular receptacle 22 and to promote good will with the patrons. The vending machine 10 is then ready for the employee, or, preferably, a second employee following the first, to engage the banking device 100 with the vending machine 10 to retrieve the token 34 from the token receptacle area 90 in the vending machine 10 and to return the retractable receptacle door 14 to the closed position shown in FIG. 13.

Figure 22:
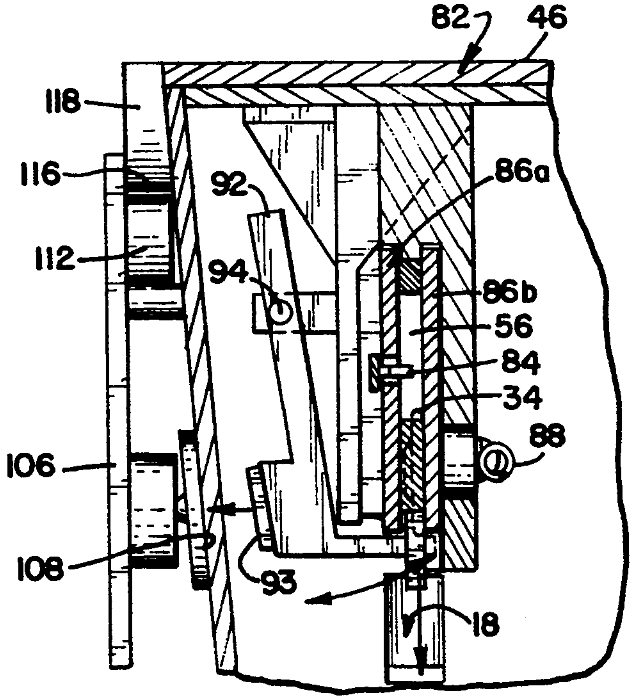
FIG. 22 is a sectional view taken along the line 22—22 of FIG. 19.

The banking device has a body 102 including a cylindrical token receptacle 104 for receiving and retaining vending apparatus operating tokens 34, two lateral end extensions 106 which extend from opposite ends of the body 102, and a coated magnetic recognition device 108 which actuates a second magnetic arm 92 in the vending machine 10 so that the token 34 in the token receptacle area 90 is free to fall under the force of gravity through the coin release slot 18 and into the token receptacle 104 of the banking device 100 via a token receiving slot 110 in the body 102. The banking device 100 also includes engaging members 112 and a handle mechanism 114 fastened to the lateral end extensions 106. The banking device 100 is engaged with banking device engaging recesses 116 on the lateral sides of the outer shell 12 of the vending machine 10. When the seat bottom 5 to which the vending apparatus 2 is attached is in an upright position, the banking device 100 will preferably fall to a first banking position, shown in FIG. 21, under the force of gravity. In this position, the coded magnetic recognition device 108 will attract a second magnetic recognition member 93 and the second magnetic arm 92 to which it is attached in the same general way as the first magnetic arm 58 is attracted to the token 34 when the token 34 is in the first token position shown in FIG. 13. As shown in FIG. 22, the second magnetic arm 92 is pivotally interconnected with the token accepting mechanism housing 82 by a second arm pin 94. When the coded magnetic recognition device 108 of the banking device 100 is placed along the side of the vending machine 10 proximate the second magnetic recognition member 93, the second magnetic arm 92 pivots on the second arm pin 94 and is drawn toward the coded magnetic recognition device 108. As shown in FIG. 22, a lateral extension 95 of the second arm 92 is then removed from a path between the token 34 in the token receptacle area 90 and the coin release slot 18 in the outer shell 12 of the vending machine 10. The token 34 then falls out of the token receptacle area 90 under the force of gravity, through the coin release slot 18 and into the token receptacle 104 via the token receiving slot. After the token 34 has been collected in the banking device 100, the employee can then lift the handle mechanism 114, thereby removing the magnetic recognition device 108 from the immediate proximity of the second magnetic arm 92, and at the same time raising the retractable receptacle door 14 to the closed position shown in FIG. 13. The receptacle door 14 is raised by a spring steel door catch 120 attached to the exterior of the cylindrical body 102 of the banking device 100. The door catch 120 is oriented so that it will insert into a door catch slot 96 in the outer shell 12 (see FIG. 8). When the employee lifts the handle mechanism 114, the door catch 120 engages a door catch reciprocating member 97 extending away from the front of the retractable door 14 into the door catch slot 96. As the handle 114 is lifted, the banking device 110 pivots about the engaging members 112 in the engaging recesses 116, and the retractable door 114 is lifted into the closed position shown in FIG. 13. As the retractable door 14 returns to the closed position, the latch portion 68 of the latch member 64 is displaced from the stable position shown in FIG. 17 by the raised lateral extension 74, but subsequently returns to the stable position under the biasing force of the latch member spring 78, thereby engaging the raised lateral extension 74 and latching the retractable door 14 when the door has returned to the closed position. The banking device 100 can then be easily disengaged by lifting the banking device 100 and disengaging the engaging members 112 from the engaging recess 116. The employee can then go on to the next vending machine 10.

Figure 6:
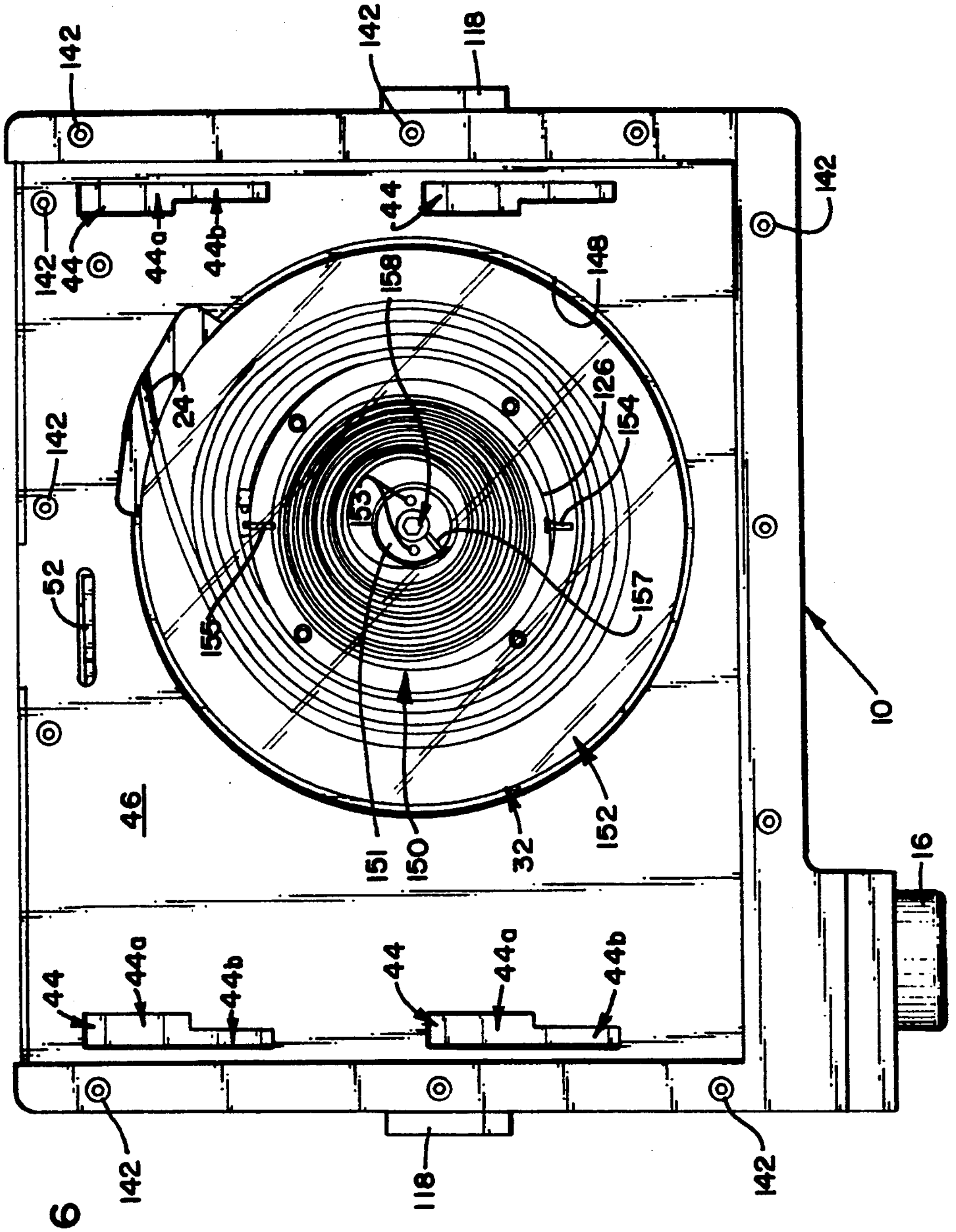
FIG. 6 is a top plan view of the binocular vending housing shown in FIG. 1 when detached from the simulated seat bottom.
Figure 7:
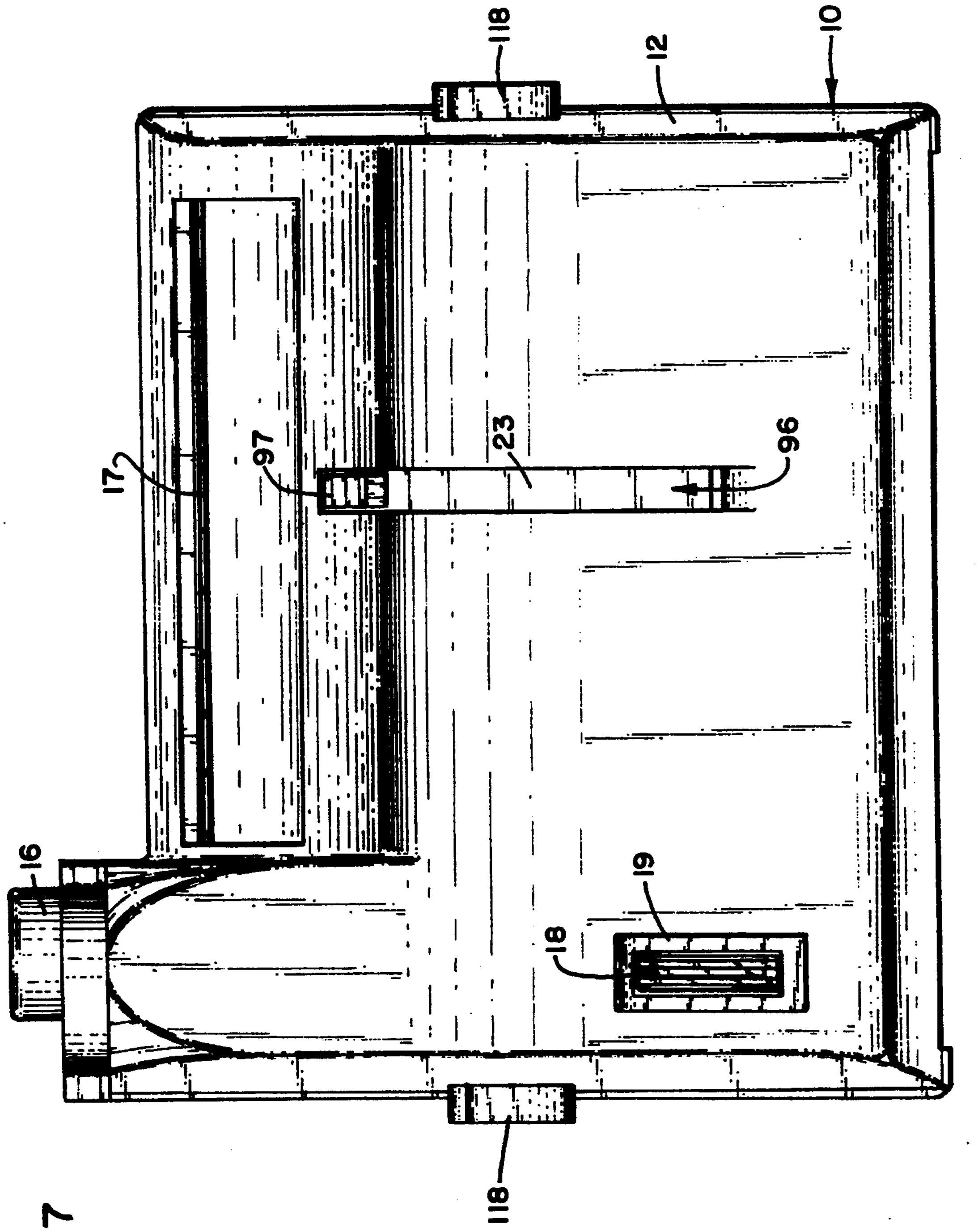
FIG. 7 is a bottom plan view of the binocular vending housing shown in FIG. 1.

The recoil tightening tool 124 shown in FIG. 9 is used in conjunction with a standard alan wrench to tighten the coil spring 126 shown in FIG. 6. When the coil spring 126 is tightened, the force with which the take-up reel 32 winds when it retracts the tether 24 is increased. It will be appreciated that the tightening tool 124 may also be used in conjunction with an alan wrench to loosen the coil spring 126 and thereby lessen the tension on the tether 124. Preferably, the tension on the tether 24 is great enough to lift the binoculars 20 out of the aisles in the facility when the binoculars are left unused and the seat bottoms 5, which are preferably spring biased, pivotal seat bottoms 5, return or are returned to an upright position as shown diagrammatically in FIG. 23. When the seat bottom 5 is in the upright position shown in FIG. 3 the reel stop mechanism 38 is disengaged from the take-up reel 32 and the take-up reel 32 is free to collect the tether 24. So long as the coil spring 126 is wound tight enough for the winding force to exceed the force placed upon the tether 24 by the weight of the binoculars 20, the take-up reel 32 will, in most cases, be able to lift the binoculars 20 off the floor and out of the aisle. This will prevent the binoculars 20 from being stepped on or kicked around on the floor of the facility by patrons as they are leaving at the conclusion of a specific event. However, because it is distracting for the patron to have to constantly pull against the force of the tightly wound coil spring 126 when the patron is using the binoculars 20, the reel stop mechanism 38 is designed to prevent the reel 32 from retracting the tether 24 when the seat bottom 5 is in the down position as shown diagrammatically is FIG. 24.

The reel stop mechanism 38 includes a weighted pivotal locking arm 134 which is pivotally interconnected with the backplate 46 (see FIG. 12). The pivotal locking arm 134 includes an engaging end 132 having a lock pin 130, and a weighted end 133. In FIG. 25, a locking pin 130 incorporated into the engaging end 132 of the weighted pivotal locking arm 134 is shown as it is being engaged with a rachet strip 136 along the underside 135 of the take-up reel 32. When the lock pin 130 is engaged in the rachet strip 136, the take-up reel 32 is prevented from taking up slack in the tether 24, thereby making it easier for the patron to manipulate the binoculars 20 when the patron is sitting on the seat 4 and holding the seat bottom 5 in the down position. It will be appreciated that this will tend to encourage the patron to remain in his or her seat 4. This is often a desirable feature from the standpoint of the facility operators who would prefer that patrons remain in their seats for a number of reasons some of which are related to safety and general crowd control.

The mounting plate 26 is preferably constructed of a polycarbonate or of Delrin TM (from DuPont). It will be appreciated, however, that the mounting plate can be made out of any suitable structural material. When attached to a pivotal seat bottom 5, the mounting plate 26 preferably attaches to the seat bottom 5 of any stadium or facility seat 4 so as to allow at least a 5-inch clearance for the binocular vending machine 10 when it is engaged with the mounting plate 26.

The mounting plate 26 is a key element of the present system. The use of a mounting plate 26 attached to a seat bottom 5 for mounting a vending machine 10 thereon, increases the owner's flexibility with respect to exposing each unit or machine 10 to a greater number of patron use opportunities because the units 10 can be easily moved from seat to seat within a particular facility to respond to changing seating configurations for different events, or from facility to facility when needs change from one facility to another for particular events. The units can also be easily moved to be serviced. In addition, although the vending machines 10 may change and the components of the vending machine 10 or the binoculars 20 may be changed, the mounting plate 26 will preferably have a universal housing interface surface 28 for mounting the vending machine or housing 10. Changes in the mounting plate 26 may need to be made to accommodate an interface with the back sides 9 of different types of seat backs 8 or the undersides 6 of different types of seat bottoms 5 found in different facilities so long as the housing interface surface 28 is universal. If no changes are made in the universal surface 28 which includes elements of the mounting mechanism for attachment of the vending machine 10 to the mounting plate 26, the mounting plates 26 can be universally acceptable for mounting vending machines 10 of various different styles and vintages. Furthermore, no changes will need to be made in the vending machines 10 to mount them on the underside of any of the various seat bottoms or the back sides of any of the various seat backs. It will be appreciated that it would be virtually economically impossible to change the vending machine 10 to conform to the many different surfaces to which there may be a desire to attach the machine 10. Since the vending machine 10 is relatively expensive to make, and the mounting plate 26 is relatively inexpensive to make, it makes much more sense to vary the mounting plate 26 to accommodate the interface with the various different seat backs 8, bottoms 5, and the like used in the various different facilities than to try to vary the vending machines 10. As alluded to above, the use of a mounting plate 26 also allows for the simple transfer of the vending machine 10, from seat to seat or from facility to facility, in an economical time frame. Without the use of a mounting plate, it would be virtually economically impossible to transfer vending machines from chair to chair or from facility to facility to accommodate changing needs for specific events. With the present system, however, which uses a mounting plate 26 attached to the seat bottom 5, vending machines 10 can be moved into one facility when that facility is anticipating a large crowd for a particularly big event, and may be subsequently moved to another facility when that facility expects to have a particularly large crowd. In addition, the vending machines 10 may be removed from outdoor facilities during off seasons so that they are not subjected to the elements. Other facilities may have a need to offer binocular vending machines 10 to its patrons during the week, while a sister facility may only need to offer binocular vending machines 10 to patrons on the weekend. In such a situation the vending machines 10 may be switched back and forth between the respective facilities thereby more fully utilizing the capital expenditure for the vending machines 10 by exposing them to greater numbers of patron use opportunities. Other facilities with need to vary the location of the vending machines 10 in the facility depending on the event, or the configuration of the seating in the facility for a particular event. For example, a facility may have a baseball game in the afternoon and a rodeo, a tractor pull, or pro wrestling in the evening. Facility configurations also need to change to accommodate football and basketball, concerts and baseball, baseball and football, and so on. In addition, broken vending machines 10 or vending units 10 are easily replaced with working units 10 without having to unscrew the vending machine 10 from a seat back 8 or a seat bottom 5 to which it is directly attached. In the present system, the damaged unit 10 is simply disengaged from the mounting plate 26 and taken to a service shop in the facility or at an off-site location. In the unit 10 is then replaced with an undamaged unit 10. It will be appreciated that the use of a universal housing interface surface 28 will provide great advantages to the entity servicing the binocular vending system envisioned by the present applicants.

It will be appreciated that the outer shell 12 of the binocular vending machine 10 may be made of any sturdy structural material. However, the outer shell 12 is preferably constructed of polycarbonate or of Delrin TM which are especially resistant to damage and are easily cleaned. The outer shell 12 can have a one-piece integrally molded design. It includes the door catch slot 96 for the door catch reciprocating member 92 of the retractable receptacle door 14, an opening 15 for the token receiving door release button 16, and the coin release slot 18 and the raised portion 19 surrounding the coin release slot 18. The outer shell 12 also includes a large generally rectangular receptacle door opening 13 for accessing the binocular receptacle 22 and raised engaging bosses 118 defining the banking device engaging recesses 116 on the sides of the outer shell 12. In the rear, there is another opening in the outer shell 12 for the insertion of the lock mechanism 48. All of the interior components of the vending machine 10 are interconnected with the back plate 46 and the back plate 46 is fastened to the outer shell 12 by a plurality of hex nuts 142.

The structural elements of the binocular vending apparatus 2 are preferably made of a polycarbonate or of Delrin TM, although, it will be appreciated that any suitable structural material may be used.

These elements include, but are not limited to the first and second magnetic arms 58 and 92, the retractable door 14, the back plate 46, the binocular receptacle box 23 which defines the binocular receptacle 22 the mounting plate 26, the shell 12, the lateral sidewalls 86*a* and 86*b*, the biasing arms 81 and 85, and the protective shell for the binoculars 20. The binocular receptacle box 23 actually holds the binoculars 20 and is attached to the back plate 46. The curved shape allows the door 14 to rotate downward into the housing 10 which also has a curved outer surface which generally reciprocates the curve of the retractable door 14.

At the rear of the receptacle box are rollers 143 and 144 which are pivotally interconnected with the box 23 to facilitate movement of the tether 24. The rollers 143 and 144 are pivotally attached so that they can roll when the tether 24 is pulled out of the housing 10 or retracted back into the housing 10 by the take-up reel 32 and act to guide the tether 24 during these processes. The take-up reel 32 is also preferably constructed primarily of polycarbonate or of Delrin TM. It will be appreciated that any of the elements constructed of these compositions may be made of other suitable structural material.

The recoil mechanism 150 comprises the coil spring 126 and the take-up reel 32. The take-up reel 32 includes a smaller one-piece spool 151, upon which a larger spool 152 turns. The smaller spool 151 has two small recesses 153 in which the recoil tightening tool 124 can be engaged. The coil spring 126 is a spring steel coil spring. It is engaged at one end to the larger spool 152 by a large spool pin member 154 and to the smaller spool 151 by a screw 157 shown in FIG. 6. The smaller spool 151 can be turned by using an alan wrench sized to fit in the recess in hex-recess axle rod 158 at the center of the take-up reel 32 to loosen the axle rod 158 so the smaller spool 151 can turn freely on the axle rod 158, and turn the smaller spool 151 with the tightening tool 124. If the tightening tool 124 is turned in one direction while the larger spool 152 is held steady, the spring coil 126 will be tightened. If it is turned in the other direction, the coil spring 126 will be loosened. The large spool 152 pivots on the smaller spool 151 which is pivotally connected to the back plate 46 in the take-up reel recess 148 by the axle rod 158. The tether 24 is attached to the larger spool 152 by a tether pin 155 and is wound around the larger spool 152 when retracted. On the underside 135 of the larger spool 152 the ratchet strip 136 provides a stair-step mechanism which can be engaged by the locking pin 130 of the reel stop mechanism 38. When the vending machine 10 is in a generally horizontal orientation attached to a mounting plate 26 on a seat bottom 5 which is in a down position, the weighted end 133 of the weighted pivotal locking arm 134 will move the engaging end 132 into such a position that the locking pin 130 will become engaged in the rachet strip 136 and will prevent the larger spool from retracting the tether 24. The tether 24 can still be pulled out of the housing 10 because the sloped stair-step arrangement of the rachet strip 136 is angled in such a way that the engagement of the pin 130 in with the strip 136 only prevents the take-up reel 32 from turning in the direction in which tether is wound upon the larger spool 152. When the seat bottom 5 returns to the upright position, however, the take-up reel 32 is then free to retract the tether 24 and will place a tension on the tether 24 when the seat bottom is in such a position because the weighted locking arm 134 will pivot, thereby disengaging the pin 130 from the strip 136, and freeing the reel 32 to turn.

The banking device 100 is preferably constructed of polycarbonate or of Delrin TM, but may be made of any suitable structural material. It is a hand-held unit which will store up to 200 tokens. It will be appreciated, however, that the size of the body may vary, allowing for additional storage space which may accommodate a larger number of tokens. The banking device 100 is preferably emptied into a central banking unit (not shown) by means of a coded magnetic recognition system similar to that which allows the banking device 100 to obtain the release of the operating tokens 34 from the vending machines 10.

The present invention provides for a method of vending binoculars to patrons in a facility, or of providing a binocular vending service for a facility or stadium for spectator events; wherein the facility has a plurality of seats preferably having spring biased, pivotal seat bottoms, each seat bottom having an underside. The method preferably includes the steps of: providing a plurality of binocular vending machines, wherein each vending machine has a pair of binoculars tethered thereto and removably contained therein; attaching individual mounting plates to the underside of each of a percentage of the plurality of seats; and removably and individually mounting a percentage of said plurality of binocular vending machines on a plurality of said mounting plates such that a predetermined number of binocular vending machines will be available to spectators for a specific spectator event at predetermined seat locations in the facility.

In an alternate embodiment of the present invention, a method of providing a binocular vending operation service for a plurality of facilities for spectator events, or of vending binoculars to patrons in a plurality of facilities, is also provided, wherein the plurality of facilities include first and second facilities, each facility having a plurality of seats preferably having spring biased, pivotal seat bottoms, each seat bottom having an underside. The method preferably includes the steps of: providing a plurality of binocular vending machines 10, each vending machine having a pair of binoculars 20 tethered thereto and removably contained therein; attaching individual mounting plates 26 to the underside 6 of each of a percentage of the seat bottoms 5 of the plurality of seats 4 in each of the respective facilities; removably and individually mounting a percentage of said plurality of binocular vending machines 10 on a plurality of said mounting plates 26 attached to the seat bottoms 5 in the first facility such that binoculars are made available in vending machines to patrons in the first facility for a first period of time at a first number of seat locations individually dismounting binocular vending machines mounted on seat bottoms in the first facility and moving the dismounted binocular vending machines from the first facility to the second facility; and removably and individually mounting a percentage of said dismounted binocular vending machines on mounting plates attached to seat bottoms in the second facility such that binoculars are made available in vending machines to patrons in the second facility for a second period of time at a second number of seat locations. As used in the present application, "a percentage" can mean from about 1% to 100%.

It is to be understood, however, that even though numerous characteristics and advantages of the present invention have been set forth in the foregoing description, together with details of the structure and function of the invention, and details of the various steps of the methods of the present invention, the disclosure is only illustrative, and changes in matters of order, shape, size, and arrangement of parts and/or steps may be made within the principles of the invention and to the full extent indicated by the broad general meaning of the terms in which the appended claims are expressed.

What is claimed:

1. A binocular vending apparatus for attachment to a structure, said apparatus comprising:

(a) binoculars;

(b) housing means for removably retaining said binoculars; and (c) an elongated tether for interconnecting said binoculars with said housing means;

said housing means including tether retraction means for retracting a portion of the elongated tether, said retraction means including biasing means for placing a bias upon the tether, said biasing means including bias actuation means for actuating said biasing means upon the occurrence of a predetermined event, wherein said biasing means can place a bias upon the tether toward retraction of the tether when the tether is withdrawn from said housing means and the predetermined event occurs.

2. The binocular vending apparatus of claim 1 wherein said housing means includes a housing; said housing including a receptacle for receiving and removably retaining said binoculars; said housing including a retractable receptacle door which blocks normal access to said receptacle when said door is in a closed position.

3. The binocular vending apparatus of claim 2, further comprising a door latch mechanism and token accepting vending means for actuating said door latch member mechanism, said door latch mechanism including a pivotal door latch which locks said door in a closed position when said door is engaged with said latch member.

4. The binocular vending apparatus of claim 3 wherein said token accepting means include coded magnetic token recognition means for recognizing a token having a magnetic code, wherein magnetic recognition of the magnetic token actuates movement of a first magnetic arm to a biased position, wherein an extension rod of said first magnetic arm is in position to encounter an arm of said pivotal door latch when said token accepting vending means are actuated in a predetermined manner and wherein said extension rod can be moved laterally to actuate pivotal movement of said latch member, thereby releasing said retractable door to assume an open position.

5. The binocular vending apparatus of claim 1 wherein said housing means is interconnected with a pivotal seat bottom having a substantially upright position and a down position, and wherein the predetermined event occurs when the pivotal seat bottom is in the substantially upright position.

6. The binocular vending apparatus of claim 5 wherein said housing means and said mounting plate, respectively, include first and second locking means for cooperating to releasably lock said housing means to the mounting plate when the mounting plate is secured to the structure.

7. The binocular vending apparatus of claim 6 wherein said structure is one of a plurality of structures and said housing means are removably mounted to one of a plurality of substantially identical mounting plates individually attached to said plurality of structures.

8. A method of vending binoculars to a patron having access to a seat in a facility, the seat having a seat bottom on which the spectator can sit and the seat bottom having an underside, said method comprising the steps of:

(a) providing a mounting plate for attachment to the underside of the seat bottom and housing means for removably retaining the binoculars, wherein the binoculars are connected to said housing means by an elongated tether, said housing means including tether retraction means for retracting a portion of the elongated tether, said retraction means including biasing means for placing a bias upon the tether;

(b) attaching said mounting plate to the underside of the seat bottom; and (c) removably mounting said housing means on said mounting plate such that the patron can access the binoculars by withdrawing binoculars from said housing means and simultaneously withdrawing the tether from said tether retraction means, wherein said retraction means are provided to retract the tether upon the occurrence of a predetermined event.

9. The method of claim 8 wherein said housing means and said mounting plate respectively include first and second locking means for cooperating to releasably lock said housing to the mounting plate when the mounting plate is attached to the seat bottom, wherein said step of removably mounting said housing means on said mounting plate includes engaging said first and second locking means so as to lock said housing means to said mounting plate.

10. A method of vending binoculars to patrons at a series of different spectator events occurring in a spectator facility, the facility having a plurality of seats and a plurality of seat locations, said method comprising the steps of:

(a) providing a plurality of substantially identical mounting plates and a plurality of binocular vending machines, each vending machine including binoculars and housing means including tether retraction means and an elongated tether interconnecting the binoculars to said tether retraction means, said retraction means including biasing means for placing a bias upon the tether, said biasing means including bias actuation means for actuating said biasing means upon the occurrence of a predetermined event, wherein said biasing means can place a bias upon the tether toward retraction of the tether when the tether is withdrawn from said housing means and the predetermined event occurs, said binoculars being removably contained, said housing means having means for mounting said housing means to one of said plurality of substantially identical mounting plates;

(b) attaching each of the plurality of substantially identical mounting plates to each of a percentage of the plurality of seats;

(c) removably and individually mounting each of a first percentage of said plurality of binocular vending machines to a second percentage of said plurality of substantially identical mounting plates such that a first number of binocular vending machines will be available to patrons at a first subset of said plurality of seat locations for a first event in said series of different spectator events; and (d) removing a third percentage of the vending machines mounted on mounting plates for the first event and remounting a fourth percentage of the removed vending machines on a fifth percentage of the plurality of mounting plates such that vending machines are available to patrons at a second subset of said plurality of seat locations for a second event in said series of different spectator events, said second subset differing from said first subset.

11. A method of vending binocular machines to patrons at a series of different spectator events occurring in a plurality of spectator facilities including first and second facilities, each facility having a plurality of seats at a plurality of seat locations, said method comprising the steps of:

(a) providing a plurality of substantially identical mounting plates and a plurality of binocular vending machines, each vending machine including binoculars and housing means including tether retraction means and an elongated tether interconnecting the binoculars to said tether retraction means, said retraction means including biasing means for placing a bias upon the tether, said biasing means including bias actuation means for actuating said biasing means upon the occurrence of a predetermined event, wherein said biasing means can place a bias upon the tether toward retraction of the tether when the tether is withdrawn from said housing means and the predetermined event occurs;

(b) attaching each of the plurality of mounting plates to one of a plurality of seats in each one of said plurality of spectator facilities such that one of said mounting plates is attached to each of a certain percentage of seats in each of the respective facilities;

(c) removably and individually mounting a first percentage of said plurality of binocular vending machines to a plurality of the mounting plates attached to seats in the first facility such that binoculars are made available in said vending machines to patrons in the first facility for a first event in the series of different spectator events;

(d) dismounting binocular vending machines removable mounted to mounting plates in the first facility following the first event;

(e) moving the dismounted binocular vending machines from the first facility to the second facility prior to the occurrence of a second event in the series of different spectator events; and (f) removably and individually mounting said dismounted binocular vending machines moved to the second facility and mounting plates attached to seats in the second facility such that binoculars removably contained therein are available in vending machines to patrons in the second facility for a second event in the series of different spectator events, the second event subsequent to the first spectator event.

12. A spectator facility in which a series of different spectator events occur over a period of time, said spectator facility comprising:

(a) a plurality of seats located in a plurality of seat locations;

(b) a plurality of binocular vending machines, each vending machine including housing means having binoculars tethered thereto and removably contained therein and including means for attaching the vending machine individually to any of said plurality of seats; wherein a first percentage of said plurality of binocular vending machines are attached to a second percentage of said plurality of seats such that a first number of binoculars are available within each of the respective vending machines to patrons at a first subset of said plurality of seat locations for a first event in a series of different spectator events;

said housing means including tether retraction means for retracting a portion of the elongated tether, said retraction means including biasing means for placing a bias upon the tether, said biasing means including bias actuation means for actuating said biasing means upon the occurrence of a predetermined event, wherein said biasing means can place a bias upon the tether toward retraction of the tether when the tether is withdrawn from said housing means and the predetermined event occurs.

13. A binocular vending apparatus for attachment to a structure, said apparatus comprising:

(a) binoculars;

(b) housing means for removably retaining said binoculars, said housing means including an elongated tether and tether retraction means for retracting a portion of the elongated tether, said elongated tether interconnecting said tether retraction means with said binoculars, said retraction means including biasing means for placing a bias upon the tether, said biasing means including bias actuation means for actuating said biasing means upon the occurrence of a predetermined event, wherein said biasing means can place a bias upon the tether toward retraction of the tether when the tether is withdrawn from said housing means and the predetermined event occurred; and (c) a separate mounting plate, said mounting plate being attachable to the structure; wherein said housing means are mountable to said mounting plate when said mounting plate is attached to the structure; said housing means and said mounting plate including first and second cooperating locking means, respectively, engageable with one another, and first and second cooperating alignment means, respectively, for cooperatively engaging one another in aligning said first and second locking means such that said housing means can be locked to said mounting plate when said mounting plate is attached to the structure.

14. The binocular vending apparatus of claim 13 wherein said housing means include a housing; said housing including a receptacle for receiving and removably retaining said binoculars; said housing including a retractable receptacle door which blocks normal access to said receptacle when said door is in a closed position.

15. The binocular vending apparatus of claim 14, further comprising a door latch mechanism and token accepting vending means for actuating said door latch mechanism, said door latch mechanism including a pivotal door latch which locks said door in the closed position when said door is engaged with said latch mechanism.

16. The binocular vending apparatus of claim 15 wherein said token accepting vending means include coded magnetic token recognition means for recognizing a token having a magnetic code, wherein magnetic recognition of the magnetic token actuates movement of a first magnetic arm to a biased position, wherein an extension rod of said first magnetic arm is in position to encounter an arm of said pivotal door latch when said token accepting vending means are actuated in a predetermined manner and wherein said extension rod can be moved laterally to actuate pivotal movement of said door latch, thereby releasing said retractable door to assume an open position.

17. A vending apparatus for attachment to a structure, said apparatus comprising:

(a) view enhancing equipment;

(b) housing means for removably retaining said view enhancing equipment; and (c) an elongated tether for interconnecting said view enhancing equipment with said housing means;

said housing means including tether retraction means for retracting a portion of the elongated tether, said tether retraction means including biasing means for placing a bias upon the tether, said biasing means including bias actuation means for actuating said biasing means upon the occurrence of a predetermined event, wherein said biasing means can place a bias upon the tether toward retraction of the tether when the tether is withdrawn from said housing means and the predetermined event occurs.

18. The vending apparatus of claim 17 wherein said housing means includes a housing; said housing including a receptacle for receiving and removably retaining said view enhancing equipment; said housing including a retractable receptacle door which blocks normal access to said receptacle when said door is in a closed position.

19. The vending apparatus of claim 18, further comprising a door latch mechanism and token accepting vending means for actuating said door latch member mechanism, said door latch mechanism including a pivotal door latch which locks said door in a closed position when said door is engaged with said latch member.

20. The vending apparatus of claim 19 wherein said token accepting means include coded magnetic token recognition means for recognizing a token having a magnetic code, wherein magnetic recognition of the magnetic token actuates movement of a first magnetic arm to a biased position, wherein an extension rod of said first magnetic arm is in position to encounter an arm of said pivotal door latch when said token accepting vending means are actuated in a predetermined manner and wherein said extension rod can be moved laterally to actuate pivotal movement of said latch member, thereby releasing said retractable door to assume an open position.

21. The vending apparatus of claim 17 wherein said housing means is interconnected with a pivotal seat bottom having a substantially upright position and a down position, and wherein the predetermined event occurs when the pivotal seat bottom is moved from the down position to the substantially upright position.

22. The vending apparatus of claim 17 further including a mounting plate, wherein said housing means are removably mounted to the mounting plate and the mounting plate is secured to the structure.

23. The vending apparatus of claim 22 wherein said housing means and said mounting plate, respectively, include first and second locking means for cooperating to releasably lock said housing means to the mounting plate when the mounting plate is secured to the structure.

24. The vending apparatus of claim 23 wherein said structure is one of a plurality of structures and said housing means are removably mounted to one of a plurality of substantially identical mounting plates individually attached to said plurality of structures.

* * * * *